United States Patent
Isberg et al.

(10) Patent No.: US 11,394,931 B2
(45) Date of Patent: Jul. 19, 2022

(54) MULTIMEDIA CAPTURE AND EDITING USING WIRELESS SENSORS

(71) Applicant: SONY GROUP CORPORATION, Tokyo (JP)

(72) Inventors: Peter Isberg, Lund (SE); Thomas Waldner, Lund (SE); Käre Agardh, Lund (SE); Ola Thörn, Lund (SE); Simon Henning, Lund (SE); Petter Alexandersson, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 137 days.

(21) Appl. No.: 16/492,812

(22) PCT Filed: Mar. 13, 2017

(86) PCT No.: PCT/US2017/022064
§ 371 (c)(1),
(2) Date: Sep. 10, 2019

(87) PCT Pub. No.: WO2018/169509
PCT Pub. Date: Sep. 20, 2018

(65) Prior Publication Data
US 2021/0144342 A1 May 13, 2021

(51) Int. Cl.
*H04N 7/18* (2006.01)
*G06F 16/23* (2019.01)
(Continued)

(52) U.S. Cl.
CPC ......... *H04N 7/188* (2013.01); *G06F 16/2379* (2019.01); *H04N 5/23245* (2013.01); *H04N 5/77* (2013.01); *H04W 4/029* (2018.02)

(58) Field of Classification Search
USPC .................................. 386/223–229, 239–248
See application file for complete search history.

(56) References Cited

U.S. PATENT DOCUMENTS 8,270,801 B2 * 9/2012 Ge .......................... H04N 5/272
386/224
2009/0040301 A1 2/2009 Sandler
(Continued)

FOREIGN PATENT DOCUMENTS

WO 2009135262 11/2009
WO 2017011814 1/2017

OTHER PUBLICATIONS

PCT International Search Report dated Aug. 9, 2017 for corresponding PCT International Application No. PCT/US2017/022064 (6 pages).
(Continued)

*Primary Examiner* — Hung Q Dang
(74) *Attorney, Agent, or Firm* — Myers Bigel, P.A.

(57) ABSTRACT

An image capturing device may include a recording circuit configured to record multimedia data of a field of view of the image capturing device, a receiving circuit configured to receive a wireless signal from a wireless sensor, a location determining circuit configured to determine, based on the received wireless signal, a location of the wireless sensor, and a storage circuit configured to store data associated with the wireless sensor responsive to a comparison of the determined location of the wireless sensor and the field of view of the image capturing device so as to create an association between the data associated with the wireless sensor and the recorded multimedia data.

11 Claims, 16 Drawing Sheets

(51) Int. Cl.
*H04N 5/232* (2006.01)
*H04N 5/77* (2006.01)
*H04N 9/82* (2006.01)
*H04N 5/783* (2006.01)
*G11B 27/031* (2006.01)
*H04W 4/029* (2018.01)

(56) References Cited

U.S. PATENT DOCUMENTS

| | | | | |
|---|---|---|---|---|
| 2009/0141138 A1* | 6/2009 | DeAngelis | ............. | G06F 16/58 |
| | | | | 348/220.1 |
| 2009/0304374 A1* | 12/2009 | Fruehauf | ............. | G01S 5/0284 |
| | | | | 396/153 |
| 2010/0245588 A1* | 9/2010 | Waehner | ............. | G01S 13/74 |
| | | | | 348/169 |
| 2011/0234819 A1* | 9/2011 | Gabriel | ............. | H04N 1/00137 |
| | | | | 348/207.1 |
| 2012/0250528 A1* | 10/2012 | Yamada | ............. | H04L 43/0817 |
| | | | | 370/250 |
| 2013/0230293 A1* | 9/2013 | Boyle | ............. | F16M 11/242 |
| | | | | 386/224 |
| 2014/0036088 A1 | 2/2014 | Gabriel | | |
| 2015/0281567 A1* | 10/2015 | Tsui | ............. | H04N 7/188 |
| | | | | 348/143 |
| 2016/0150196 A1 | 5/2016 | Horvath | | |

OTHER PUBLICATIONS

PCT Written Opinion of the International Searching AuthorityInternational Search Report dated Aug. 9, 2017 for corresponding PCT International Application No. PCT/US2017/022064 (9 pages).

PCT Notification Concerning Transmittal of International Preliminary Report on Patentability, dated Sep. 26, 2019, for corresponding PCT International Application No. PCT/US2017/022064 (11 pages).

\* cited by examiner

1

MULTIMEDIA CAPTURE AND EDITING USING WIRELESS SENSORS

CROSS-REFERENCE TO RELATED APPLICATIONS

The present application is a 35 U.S.C. § 371 national phase application of PCT Application Serial No. PCT/US2017/022064, filed Mar. 13, 2017, the disclosure of which is hereby incorporated herein in its entirety by reference.

BACKGROUND

The present inventive concepts relate to image capture systems, methods, and computer program products and, in particular, image systems, methods, and computer program products for image capturing in active environments.

Participants of events in active environments, such as sports or races, often desire the ability to capture images of themselves while participating in the event. For example, race participants would often like a picture taken of them during the race. However, capturing such images is often difficult.

The participant may bring an image capturing device, but it is often difficult or dangerous to film oneself while participating in the event. For example, the race participant may attempt to take a "selfie" during the race, but it may be awkward, or even impossible, to capture such an image without distraction. Even if captured, such an image may be from an unflattering or limited angle based on the limited field-of-view attainable in a self-captured image.

Another possibility is to request that an observer or other participant capture the image during the event, but this scenario also has difficulties. For example, an observer may not be able to get the best view of the action from the periphery of the event. Also, another participant may not be able to dedicate the concentration required to frame and select the appropriate moment to capture the image.

Some equipment, such as mounted action cameras, may allow participants to mount cameras on themselves, such as to clothing or a helmet, and continuously record the environments around them. However, such a continuously-recorded stream may result in long stretches of video, or large numbers of images, that must be reviewed in order to select the most appropriate moments in which the participant is interested. For example, the participant may have to spend hours reviewing such captured images to determine which portions actually include the participant.

In addition, such a review to determine portions of the captured images that are relevant to the participant often has to take place via a computer, which may require that all of the continuously-recorded images be uploaded to a server before they can be reviewed. This can take additional time and storage space to upload and store portions of the continuously-recorded images that are not relevant to the participant.

BRIEF SUMMARY

According to aspects of the present inventive concepts, methods, image capturing devices and computer program products are provided that automatically record multimedia data based on positioning of a wireless sensor. In addition, methods, computer devices, and computer program products are provided that are configured to receive recorded multimedia data and automatically create a compiled multimedia collection based on additional data from wireless sensors that are associated with segments of the received recorded multimedia data.

According to aspects of the present inventive concepts, an image capturing device may include a recording circuit configured to record multimedia data of a field of view of the image capturing device, a receiving circuit configured to receive a wireless signal from a wireless sensor, a location determining circuit configured to determine, based on the received wireless signal, a location of the wireless sensor, and a storage circuit configured to store data associated with the wireless sensor responsive to a comparison of the determined location of the wireless sensor and the field of view of the image capturing device so as to create an association between the data associated with the wireless sensor and the recorded multimedia data.

In some embodiments, the image capturing device may further include a mode circuit configured to alter an image capture rate of the recording circuit based on the determined location of the wireless sensor.

In some embodiments, the mode circuit may be configured to alter the image capture rate of the recording circuit from a non-recording rate to a recording rate.

In some embodiments, the mode circuit may be configured to alter the image capture rate of the recording circuit from a video rate to a still-photo rate.

In some embodiments, the image capturing device may further include a speed determining circuit configured to determine, based on the received wireless signal, a speed of the wireless sensor. The mode circuit may be configured to alter the image capture rate of the recording circuit based on a determined speed of the wireless sensor.

In some embodiments, the mode circuit may be configured to alter the image capture rate of the recording circuit by changing a frame rate of video recorded by the image capturing device responsive to determining the speed of the wireless sensor.

In some embodiments, the mode circuit may be configured to alter the image capture rate of the recording circuit by changing a frame rate of video recorded by the image capturing device based on the determined speed of the wireless sensor, or changing from a single photo rate to a burst photo rate based on the determined speed of the wireless sensor.

In some embodiments, the image capturing device may further include a movement circuit configured to alter a position and/or orientation of the image capturing device based on the determined location of the wireless sensor.

In some embodiments, altering the orientation of the image capturing device may include altering a position and/or orientation of a lens of the image capturing device.

In some embodiments, the wireless sensor may include a plurality of wireless sensors, and the storage circuit may be further configured to store a respective priority for each of the plurality of wireless sensors. The movement circuit may be configured to alter the field of view of the image capturing device based on the determined location of at least one of the plurality of wireless sensors and based on the respective priority of the at least one of the plurality of wireless sensors.

In some embodiments, the image capturing device may be a first image capturing device that further includes a communication circuit configured to wirelessly communicate with a second image capturing device. The communication circuit may be configured to wirelessly communicate configuration information associated with the plurality of wireless sensors to a second image capturing device.

In some embodiments, the image capturing device may be configured to alter the field of view of the image capturing device responsive to a determination that the wireless sensor can be placed in view of the image capturing device by altering the field of view of the image capturing device.

In some embodiments, the storage circuit may be further configured to store a time based on the data received from the wireless sensor and the determined location of the wireless sensor. The time that is stored may be based on a determination that the wireless sensor is positioned so as to be recorded by the image capturing device.

In some embodiments, the image capturing device may be configured to determine that the wireless sensor is positioned so as to be recorded by the image capturing device based on a determination that the wireless sensor is in view of a lens of the image capturing device.

In some embodiments, the communication circuit may be further configured to transmit the stored data, the stored time, and the recorded multimedia data to a computer server over a network.

In some embodiments, the location determining circuit is configured to determine the location of the wireless sensor based on location data contained within the received wireless signal.

According to aspects of the present inventive concepts, a method of operating an image capturing device may include recording multimedia data of a field of view of the image capturing device, receiving a wireless signal from a wireless sensor, determining, based on the received wireless signal, a location of the wireless sensor, and storing data associated with the wireless sensor responsive to a comparison of the determined location of the wireless sensor and the field of view of the image capturing device so as to create an association between the data associated with the wireless sensor and the recorded multimedia data.

In some embodiments, the method may further include altering an image capture rate of the image capturing device based on the determined location of the wireless sensor.

In some embodiments, altering the image capture rate may include altering the image capture rate from a non-recording rate to a recording rate.

In some embodiments, altering the image capture rate may include altering the image capture rate from a video rate to a still-photo rate.

In some embodiments, the method may further include determining, based on the received wireless signal, a speed of the wireless sensor, and altering the image capture rate of the recording circuit based on a determined speed of the wireless sensor.

In some embodiments, altering the image capture rate may include changing a frame rate of video recorded by the image capturing device based on the determined speed of the wireless sensor, or changing from a single photo rate to a burst photo rate based on the determined speed of the wireless sensor.

In some embodiments, the method may further include altering an orientation and/or position of the image capturing device based on the determined location of the wireless sensor.

In some embodiments, the method may further include altering the field of view of the image capturing device responsive to determining that the wireless sensor can be placed in view of the image capturing device by altering the field of view of the image capturing device.

In some embodiments, the method may further include storing a time based on the data received from the wireless sensor and the determined location of the wireless sensor. The time that is stored may be based on determining that the wireless sensor is positioned so as to be recorded by the image capturing device.

In some embodiments, determining that the wireless sensor is positioned so as to be recorded by the image capturing device may include determining that the wireless sensor is in view of a lens of the image capturing device.

In some embodiments, the method of operating the image capturing device may be embodied by a computer program product include a tangible non-transitory computer readable storage medium having computer readable program code embodied in the medium that, when executed by a processor, performs the method.

According to aspects of the present inventive concepts, a method of operating a computer server may include the operations of receiving recorded multimedia data over a network, receiving a sensor identification, determining that the received sensor identification identifies a first wireless sensor associated with a first segment of the recorded multimedia data, determining that the received sensor identification does not identify a second wireless sensor associated with a second segment of the recorded multimedia data, and creating a compiled multimedia collection comprising the first segment of the recorded multimedia data and not the second segment of the recorded multimedia data responsive to determining that the received sensor identification identifies the first wireless sensor and determining that the received sensor identification does not identify the second wireless sensor.

In some embodiments, the operations may further include receiving sensor data associated with the first wireless sensor.

In some embodiments, the received sensor data may indicate that the first wireless sensor is at a location that is visible within the recorded multimedia data.

In some embodiments, the received sensor data may include a timestamp portion that indicates a time period of the recorded multimedia data that is associated with the first wireless sensor.

In some embodiments, the operations may further include determining that the received sensor identification identifies the first wireless sensor associated with a third segment of the recorded multimedia data, determining that the first wireless sensor is associated with a first time period of the first segment of the recorded multimedia data, and determining that the first wireless sensor is associated with a second time period of the third segment of the recorded multimedia data.

In some embodiments, the operations may further include determining that the first segment and the third segment of the recorded multimedia data overlap in time.

In some embodiments, the operations may further include responsive to determining that the first segment and the third segment of the recorded multimedia data overlap in time, creating a combined segment of the compiled multimedia collection that includes the first segment and the third segment presented simultaneously.

In some embodiments, the first segment may be a video segment and the third segment may be a photo segment.

In some embodiments, the operations further include determining from the received sensor data a first distance of the first wireless sensor for the first segment of the recorded multimedia data and a second distance of the first wireless sensor for the third segment of the recorded multimedia data, and responsive to determining that the first segment of the recorded multimedia data and the third segment of the recorded multimedia data overlap in time, not including the third segment in the compiled multimedia collection responsive to a comparison of the first distance to the second distance.

In some embodiments, the method of operating the computer server may be embodied by a computer program product include a tangible non-transitory computer readable storage medium having computer readable program code embodied in the medium that, when executed by a processor, performs the operations of the method.

In some embodiments, the method of operating the computer server may be embodied by a computing device configured to perform the operations of the method.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Aspects of the present inventive concepts are illustrated by way of example and are not limited by the accompanying figures with like references indicating like elements.

DETAILED DESCRIPTION

Figure 1:
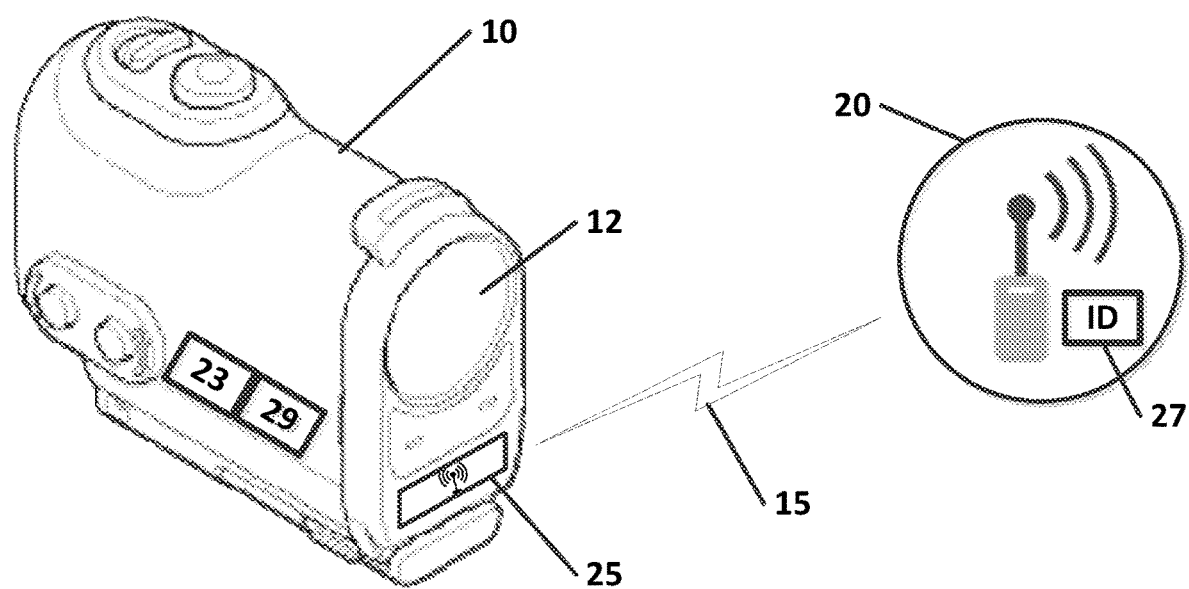
FIG. 1 illustrates an image capturing device in communication with a wireless sensor according to embodiments of the present inventive concepts.

The present inventive concepts are described hereinafter with reference to the accompanying drawings, in which embodiments of the present inventive concepts are shown. The present inventive concepts may, however, be embodied in different forms and should not be construed as limited to the embodiments set forth herein. Rather, these embodiments are provided so that this disclosure is thorough and complete and fully conveys the scope of the present inventive concepts to one skilled in the art.

The terminology used herein is for the purpose of describing particular aspects only and is not intended to be limiting of the present inventive concepts. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," "on" versus "directly on").

It will be understood that although the terms "first," "second," etc. are used herein to describe members, regions, portions, sections, components, and/or elements in example embodiments of the present inventive concepts, the members, regions, portions, sections, components, and/or elements should not be limited by these terms. These terms are only used to distinguish one member, region, portion, section, component, or element from another member, region, portion, section, component, or element. Thus, a first member, region, portion, section, component, or element described below may also be referred to as a second member, region, portion, section, component, or element without departing from the scope of the present inventive concepts. For example, a first element may also be referred to as a second element, and similarly, a second element may also be referred to as a first element, without departing from the scope of the present inventive concepts.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

Various embodiments described herein may arise from a realization that it is difficult to adequately capture images and/or video while participating in certain types of activities, such as action sports, races, etc. As used herein, such recorded images and/or video, which may include accompanying audio, are described as multimedia data. Typically, a participant of such an activity may wish to record multimedia data of those around him or her during the activity. However, the participant may have little control over the recording device (e.g., a video camera) and, as a result, the recorded multimedia data may contain a majority of recorded data that is irrelevant to the participant. Once the activity is over, the participant may have to review all of the recorded multimedia data in order to determine which of the multimedia data is relevant and which is not. In some cases, the participant may be required to perform a data transfer, e.g., from the recording device to another computer, of all of the recorded multimedia data in order to determine which portions of the multimedia data are relevant. This data transfer may require an expenditure of time or the usage of a large portion of data bandwidth to transfer data that will ultimately not be used by the participant.

The difficulty of acquiring relevant footage may be compounded when there is more than one participant of the activity. Each participant may have their own set of recorded multimedia data, each of which contains both relevant and irrelevant segments. As used herein, a relevant segment of recorded multimedia data may be a recorded segment that includes one or more participants that are of interest to a potential viewer of the multimedia data. It will be understood that a particular segment of recorded multimedia data may be relevant to a potential first viewer (e.g., contains an image of a participant that is of interest to that potential first viewer) but is irrelevant to another potential second viewer (e.g. does not contain an image of a participant that is of interest to that potential second viewer).

As an example, two groups of people may be skiing. One person of the first group may continually film the view while skiing to generate a first set of recorded multimedia data. The first set of recorded multimedia data may include video of members of both the first group and the second group while skiing. The portions of the first set of recorded multimedia that contain images of the first group of skiers may be relevant to the first group, while the portions of the first set of recorded multimedia that contain images of the second group of skiers may be relevant to the second group. Thus, certain portions of the first set of recorded multimedia may be irrelevant or not useful to the first group of skiers.

In some embodiments, image capturing devices, methods of operating, and computer program code can maximize the portions of recorded multimedia data that are relevant to a potential viewer through the use of wireless sensors. The wireless sensors may be attached to people or things such that a position of the wireless sensor, and thus the person/thing to which they are attached, may be determined and automatically recorded. Thus, the image capturing devices, methods of operating, and computer program code as described herein may reduce irrelevant portions of the recorded multimedia data, which may further reduce the amount of storage required for such multimedia data. Because the recorded multimedia data may be reduced, a transmission time required to transfer such recorded multimedia data, as well as a time required to process such recorded multimedia data, may likewise be reduced.

The recorded multimedia data may also be tagged with data associated with the wireless sensor to identify relevant portions of the recorded multimedia data. In some embodiments, computer systems, methods of operating, and computer program code may generate a compiled multimedia collection from segments of recorded multimedia data using data associated with the wireless sensors (e.g., additional data provided by wireless sensors) that is associated with segments of the recorded multimedia data based on a determined position of the wireless sensor. For example, in some embodiments, the additional data associated with the wireless sensor may include an identification that is unique to the wireless sensor. In some embodiments, a timestamp and/or the unique identification may be stored when a particular wireless sensor is determined to be within view of the image capturing device based on a wireless signal received from the wireless sensor. In this way, an association can be created between the wireless sensor and the recorded multimedia data, such that a particular segment of the recorded multimedia data that contains recorded images of the wireless sensor may be identified based on the additional stored data. In some embodiments, data transmitted by the wireless sensor to the image capturing device may also be stored, such as measurement data as measured by the wireless sensor. In this way, an additional association can be created between the wireless sensor, the recorded multimedia data, and the stored measurement data such that measurements as determined by the wireless sensor may be associated with particular segments of the recorded multimedia data.

FIG. 1 illustrates an image capturing device 10 in communication with a wireless sensor 20 according to embodiments of the present inventive concepts. The image capturing device 10 may be configured to record multimedia data captured through lens 12. The lens 12 may include a transmissive optical device that permits light and/or images to be captured by the image capturing device 10. In some embodiments, the lens 12 may include, for example, a single lens, a compound lens, and array of lenses and/or a diffractive lens, though the present inventive concepts are not limited thereto. In some embodiments, the lens 12 may include a lens aperture and/or other optical device and may be configured for autofocus, automatic light adjustment, etc. The image capturing device 10 may be a video camera, a still camera, or a device capable of video, audio and/or still image capture. The image capturing device 10 may store multimedia data captured through lens 12 onto volatile and/or non-volatile storage circuit 29 coupled to the image capturing device 10.

Though a particular camera embodiment is illustrated in FIG. 1, it will be understood that multiple embodiments of an image capturing device 10 are possible without deviating from the present inventive concepts. For example, the image capturing device 10 may be attachable to the clothing or body of a user, may be hand-held, and/or may be separately positioned from the user (e.g., fixed on a tripod or mounted to a mobile device, such as a drone). In some embodiments, the image capturing device 10 may be coupled to a movement circuit 48 (see, for example, FIGS. 5A and 5B) so as to be capable of physically and/or virtually changing a position and/or orientation of the image capturing device 10 responsive to electronically-provided control signals.

The image capturing device 10 may communicate with the wireless sensor 20 over a communication path 15. The wireless sensor 20 may be configured to transmit data over the communication path 15 to the image capturing device 10. The wireless sensor 20 may utilize various different technologies to communicate with the image capturing device 10. For example, the wireless sensor 20 may communicate using Radio Frequency Identification (RFID), Bluetooth, WiFi (e.g., IEEE 802.11 and variants thereof), ultrasonic transmission, optical transmission and/or various forms of radio, though the present inventive concepts are not limited thereto.

The wireless sensor 20 may communicate various forms of data to the image capturing device 10 over the communication path 15. For example, the wireless sensor 20 may provide a unique identification code 27 to the image capturing device 10. For example, the unique identification code 27 may be a serial number, unique address, Bluetooth ID, etc.

In some embodiments, the wireless sensor 20 may communicate other data in addition to the unique identification code 27. For example, the wireless sensor 20 may additionally contain various types of measurement devices such as, for example, accelerometers, positioning sensors, such as global positioning system (GPS) sensors, thermal sensors, gyroscopes, etc. In some embodiments, the wireless sensor 20 may additionally transmit data associated with such measurement devices to the image capturing device 10 over the communication path 15.

The wireless sensor 20 may be configured to be attached to a person or thing that is to be captured by the image capturing device 10. For example, the wireless sensor 20 may be configured to be worn on or in the clothing of a participant to be recorded. In some embodiments, the wireless sensor 20 may be part of a watch or portable mobile device, such as a phone. In some embodiments, the wireless sensor 20 may be part of equipment worn by a participant of an event such as a shoe, a helmet, a ski, a ski-pole etc. Though illustrated as a separate device in FIG. 1, the wireless sensor 20 may be a part of another device, such as a mobile device (e.g., a smartphone). In some embodiments, the wireless sensor 20 may be part of an executing smartphone application that may be identified via Bluetooth technology.

The image capturing device 10 may include a signal reception circuit 25. In some embodiments, the signal reception circuit 25 may include one or more antennas configured to receive the transmission signals provided by the wireless sensor 20. The signal reception circuit 25 may be configured to determine the relative position of the wireless sensor 20 based on the wireless signal provided by the wireless sensor 20. In some embodiments, the signal reception circuit 25 may be able to extract data provided by the wireless sensor 20 and provide the data to the image capturing device 10. For example, the signal reception circuit 25 may be configured to determine an Angle of Arrival (AOA) and/or Angle of Departure (AOD) of the wireless signal provided by the wireless sensor 20. In some embodiments, the signal reception circuit 25 may be configured to determine a signal strength of the wireless signal provided by the wireless sensor 20. The signal reception circuit 25 may be configured to determine the relative position of the wireless sensor 20 based on the determined AOA, determined AOD, and/or signal strength. In some embodiments, the signal reception circuit 25 may be configured to extract a GPS location from the wireless signal provided by the wireless sensor 20 so as to determine the relative position of the wireless sensor 20. Though specific examples of determining the relative position of the wireless sensor 20 based on the wireless signal provided by the wireless sensor 20 have been provided, one of ordinary skill in the art will recognize that multiple techniques are possible without deviating from the scope of the present inventive concepts. It will be understood that the signal reception circuit 25 of the image capturing device 10 may use one or a combination of such techniques to determine the relative position of the wireless sensor 20 based on the wireless signal provided by the wireless sensor 20.

The image capturing device 10 may optionally contain a communication circuit 23 that may be used to provide configuration information to the image capturing device 10 and/or transfer recorded multimedia data from the storage circuit 29. The configuration information may include particular unique identification codes 27 of wireless sensors 20 that may be registered with the image capturing device 10. In some embodiments, the image capturing device 10 may only determine, or give priority to the determination of, wireless sensors 20 for which the unique identification code 27 has been registered with the image capturing device 10. In some embodiments, the configuration information may contain registrations for a plurality of wireless sensors 20, and may further include a relative priority for respective ones of the wireless sensors 20, as discussed herein. In some embodiments, the configuration information may include a time configuration such that timestamps associated with the recorded multimedia data may be stored. In some embodiments, the configuration information may be shared between more than one image capturing device 10, as described herein. For example, in some embodiments, the communication circuit 23 may be used to synchronize a time setting between a plurality of image capturing devices 10.

Figure 2:
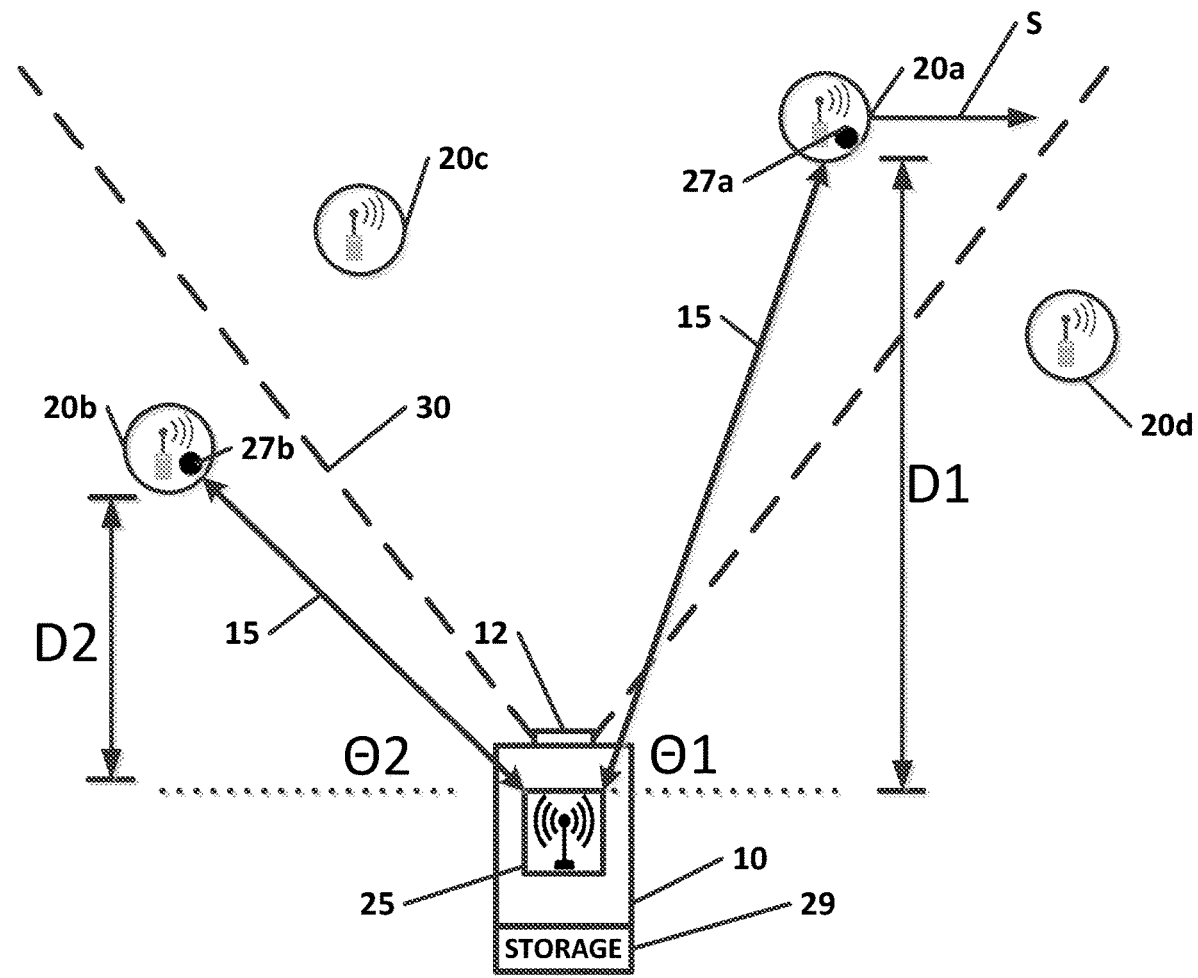
FIG. 2 illustrates an image capturing device interacting with multiple wireless sensors according to embodiments of the present inventive concepts.

FIG. 2 illustrates an image capturing device 10 interacting with multiple wireless sensors 20*a*-20*d* according to embodiments of the present inventive concepts.

Referring to FIG. 2, the image capturing device 10 including the signal reception circuit 25 may be configured to record multimedia data captured through its lens 12 onto a storage circuit 29. The storage circuit 29 may include nonvolatile and/or volatile memory.

The image capturing device 10 may receive wireless transmissions from one or more wireless sensors 20*a*-20*d*. The wireless sensors 20*a*-20*d* may be example embodiments of the wireless sensor 20 of FIG. 1. The signal reception circuit 25 may receive wireless transmissions from each of the wireless sensors 20*a*-20*d*. For clarity, FIG. 2 illustrates communication paths 15 from first and second wireless sensors 20*a* and 20*b* to the image capturing device 10 as an example, but it will be understood that each of the wireless sensors 20*a*-20*d* may be capable of transmitting such a wireless signal to be received by the signal reception circuit 25. The image capturing device 10 may process the received signals from the wireless sensors 20*a*-20*d* to determine a relative position of respective ones of the wireless sensors 20*a*-20*d*. In some embodiments, the image capturing device 10 may receive a wireless transmission from one or more of the wireless sensors 20*a*-20*d* indirectly. For example, in some embodiment one wireless sensor of the one or more of the wireless sensors 20a-20d may transmit the wireless signal for another one of the wireless sensors 20a-20d. As another example, in some embodiments a wireless beacon or repeater may transmit the wireless signal to the image capturing device 10 for one of the wireless sensors 20a-20d.

For example, the image capturing device 10 may receive a wireless signal from a first wireless sensor 20a over communication path 15 between the image capturing device 10 and the first wireless sensor 20a. The signal reception circuit 25 may determine an angle of arrival Θ1 of the received wireless signal. The signal reception circuit 25 may also determine a relative strength of the received wireless signal. The signal reception circuit 25 may be able to determine a distance D1 between the first wireless sensor 20a and the image capturing device 10 from the relative strength of the received wireless signal. Based on the determined angle of arrival Θ1 and/or the determined distance D1, the signal reception circuit 25 may determine a relative position of the first wireless sensor 20a. In some embodiments, the signal reception circuit 25 may utilize a plurality of antennas to triangulate the relative position of the first wireless sensor 20a.

The signal reception circuit 25 may also receive a first unique identification code 27a from the first wireless sensor 20a as part of the wireless transmission from the first wireless sensor 20a over communication path 15. The first unique identification code 27a may be an embodiment of the unique identification code 27 of FIG. 1 that uniquely identifies the first wireless sensor 20a among the wireless sensors 20a-20d.

In some embodiments, the signal reception circuit 25 may reference a field of view 30 of the image capturing device 10 to determine whether the first wireless sensor 20a is within view of the lens 12. The field of view 30 represents a relative area before the lens 12 that is capable of being recorded by the image capturing device 10. The field of view 30 may be defined by angle, distance, area, and/or other geometric parameters, though the present inventive concepts are not limited thereto. For example, the image capturing device 10 may have performed an operation to zoom in such that the field of view 30 is narrow. Alternatively, the image capturing device 10 may have performed an operation to zoom out (e.g., wide angle) such that the field of view 30 is wide. By comparing the determined relative position of the first wireless sensor 20a, the signal reception circuit 25 may determine that the first wireless sensor 20a is within view of the lens 12 of the image capturing device 10.

Upon determining that the first wireless sensor 20a is within view of the lens 12 of the image capturing device 10, the image capturing device 10 may perform one or more additional operations as described further herein. For example, in some embodiments, the image capturing device 10 may alter an image capture rate of the image capturing device 10. For example, the image capturing device 10 may switch from a non-recording rate (e.g., an image capture rate of zero) to a recording rate (e.g., an image capture rate greater than zero). In some embodiments, the image capturing device 10 may switch from a video rate (e.g., a higher image capture rate) to a still photo rate (e.g., a lower or single image capture rate). Other alterations are possible as described herein and understood by one of ordinary skill in the art.

In some embodiments, upon determining that the first wireless sensor 20a is within view of the lens 12 of the image capturing device 10, the image capturing device 10 may store additional data within storage circuit 29 of the image capturing device 10 corresponding to the first wireless sensor 20a. In some embodiments, the image capturing device 10 may create an association between the additional data that is stored within storage circuit 29 and the multimedia data recorded by the image capturing device 10. For example, the image capturing device 10 may store a timestamp and/or a unique identification code 27a associated with the first wireless sensor 20a. In some embodiments, the image capturing device 10 may store timestamps in the storage 29 corresponding to when the first wireless sensor 20a becomes visible within the lens 12 of the image capturing device 10 and when the first wireless sensor 20a leaves the view of the lens 12 of the image capturing device 10. In other words, the image capturing device may use the timestamps to create an association indicating when the first wireless sensor 20a is visible within the field of view 30 of the image capturing device 10 so as to be captured in the multimedia data that is recorded by the image capturing device 10. In some embodiments, the image capturing device 10 may store additional data received from the first wireless sensor 20a in the storage circuit 29 responsive to determining that the first wireless sensor 20a is within view of the lens 12 of the image capturing device 10. Such additional data can include, for example, speed data, positioning data, meteorological data, etc. received from the first wireless sensor 20a. In some embodiments, the additional data can include an identity of a person operating and/or owning the image capturing device 10 to associate with the multimedia data that is being recorded.

As an additional example, the image capturing device 10 may receive a wireless signal from a second wireless sensor 20b over communication path 15 between the image capturing device 10 and the second wireless sensor 20b. The image capturing device 10 may receive a second unique identification code 27b as part of the wireless signal. The signal reception circuit 25 may determine an angle of arrival Θ2 of the received wireless signal. The signal reception circuit 25 may also determine a relative strength of the received wireless signal. The signal reception circuit 25 may be able to determine a distance D2 between the second wireless sensor 20b and the image capturing device 10 from the relative strength of the received wireless signal. Based on the determined angle of arrival Θ2 and/or the determined distance D2, the signal reception circuit 25 may determine a relative position of the second wireless sensor 20b. In some embodiments, the signal reception circuit 25 may utilize a plurality of antennas to triangulate the relative position of the second wireless sensor 20b.

In some embodiments, the signal reception circuit 25 may reference the field of view 30 of the image capturing device 10 to determine whether the second wireless sensor 20b is within view of the lens 12. By comparing the determined relative position of the second wireless sensor 20b, the signal reception circuit 25 may determine that the second wireless sensor 20b is not within view of the lens 12 of the image capturing device 10. Upon determining that the second wireless sensor 20b is not within view of the lens 12 of the image capturing device 10, the image capturing device 10 may omit storing data related to the second wireless sensor 20b in the storage circuit 29.

In some embodiments, the signal reception circuit 25 may be configured to receive multiple wireless transmissions from the wireless sensors 20a-20d. By determining multiple relative positions of the wireless sensors 20a-20d, the signal reception circuit 25 may determine a relative speed of the wireless sensors 20a-20d, such as determined speed S of the first wireless sensor 20a. The image capturing device 10 may perform additional operations based on the determined speed of the wireless sensors 20a-20d.

In some embodiments, the image capturing device 10 may perform operations such as altering an image capture rate of the image capturing device based on a determined position of wireless sensors 20 which are not physically within view of the lens 12, but, based on their position and determined speed, will be within the lens 12 within a threshold period of time. Stated another way, upon deter mining that a particular wireless sensor (e.g. wireless sensors 20a-20d) is moving towards a position within the lens 12, the image capturing device 10 may proactively alter (e.g., increase) its image capture rate so as to be fully configured when the wireless sensor ultimately comes physically within the lens 12. Similarly, the image capturing device 10 may be configured to alter (e.g. decrease or stop) its image capture rate some threshold period of time after the wireless sensor (e.g. wireless sensors 20a-20d) has left the lens 12 so as to fully capture the participant associated with the wireless sensor 20.

As illustrated in FIG. 2, multiple wireless sensors, e.g., wireless sensors 20a-20d may be within transmission range of the image capturing device 10. In some embodiments, the image capturing device 10 may track each of the multiple wireless sensors to determine a relative position. In some embodiments, the image capturing device 10 may only determine a relative position for ones of the wireless sensors 20a-20d that are registered with the image capturing device 10. That is to say that the image capturing device 10 may maintain a list of unique identification codes 27 (see FIG. 1) which are to be tracked and may not perform tracking of ones of the wireless sensors 20a-20d that do not have unique identification codes (e.g. 27a, 27b) that are present on that list. The list of unique identification codes 27 that are to be tracked may be kept in the storage circuit 29 of the image capturing device 10. In some embodiments, a unique identification code 27 is considered to be registered with the image capturing device 10 if the unique identification code 27 is present on the list of unique identification codes 27 stored in the storage circuit 29 of the image capturing device 10. The unique identification codes 27 on the list of unique identification codes 27 may be received by the image capturing device 10 from a user of the image capturing device 10. In some embodiments, for example, the list of unique identification codes 27 may be transmitted to the image capturing device 10 from a mobile device over an electronic network. In some embodiments, the image capturing device 10 may determine a relative position of all wireless sensors 20a-20d regardless of whether they are present on a list of unique identification codes 27.

Similarly, in some embodiments, the image capturing device 10 may only store data associated with respective ones of the wireless sensors 20a-20d if the respective wireless sensor is on the list of unique identification codes 27 to be tracked. In some embodiments, the image capturing device 10 may store data associated with all wireless sensors 20a-20d regardless of whether they are present on a list of unique identification codes 27.

Though the description with respect to FIG. 2 describes using the wireless signal from the wireless sensors 20a-20d to deter mine the position of the wireless sensors 20a-20d, it will be understood that other methods may be used in conjunction with, or instead of, the receipt of the wireless signal. For example, in some embodiments, the image capturing device 10 may use object recognition technology to determine if one of the wireless sensors 20a-20d is within view of the lens 12. In some embodiments, the object recognition technology may analyze objects within view of the lens 12 to confirm that one of the wireless sensors 20a-20d and/or an object/person associated with the wireless sensors 20a-20d is within view of the lens 12. For example, the image capturing device 10 may receive a wireless signal and determine that one of the wireless sensors 20a-20d should be within view of the lens 12, and may use object recognition technology to confirm that one of the wireless sensors 20a-20d and/or an object/person associated with one of one of the wireless sensors 20a-20d is actually visible through the lens 12 (e.g. not obscured by another object).

Various ways in which the image capturing device 10 can adjust its operation according to embodiments of the present inventive concepts are described with respect to FIGS. 3A-7D.

Figure 3A:
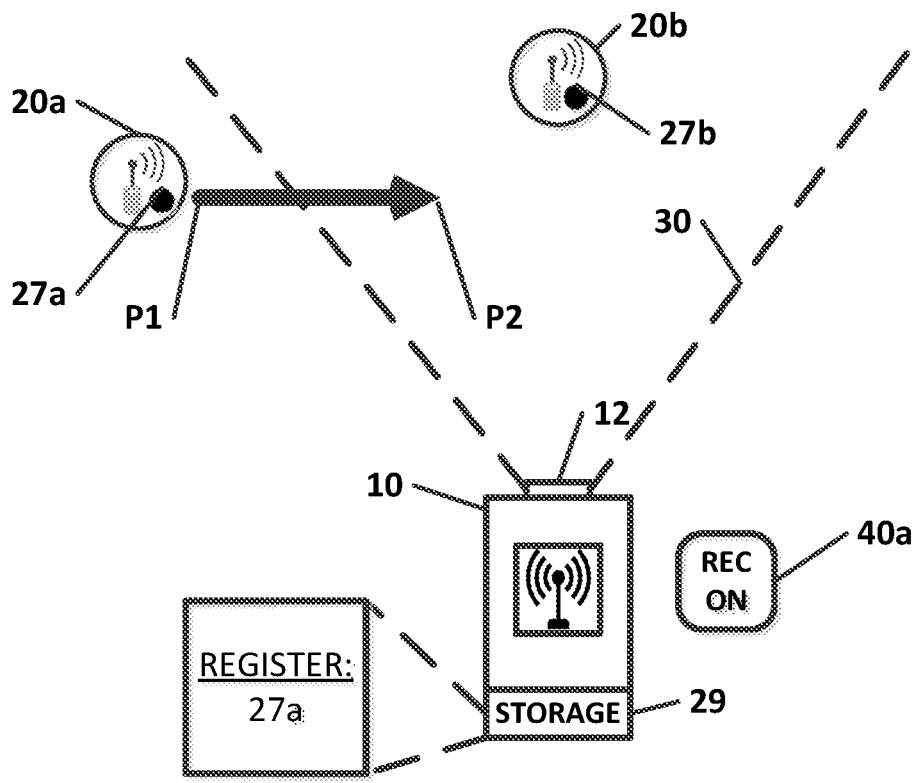
FIGS. 3A and 3B illustrate operations to alter an image capture rate of the image capturing device responsive to comparison of a determined position of a wireless sensor according to embodiments of the present inventive concepts.
Figure 3B:
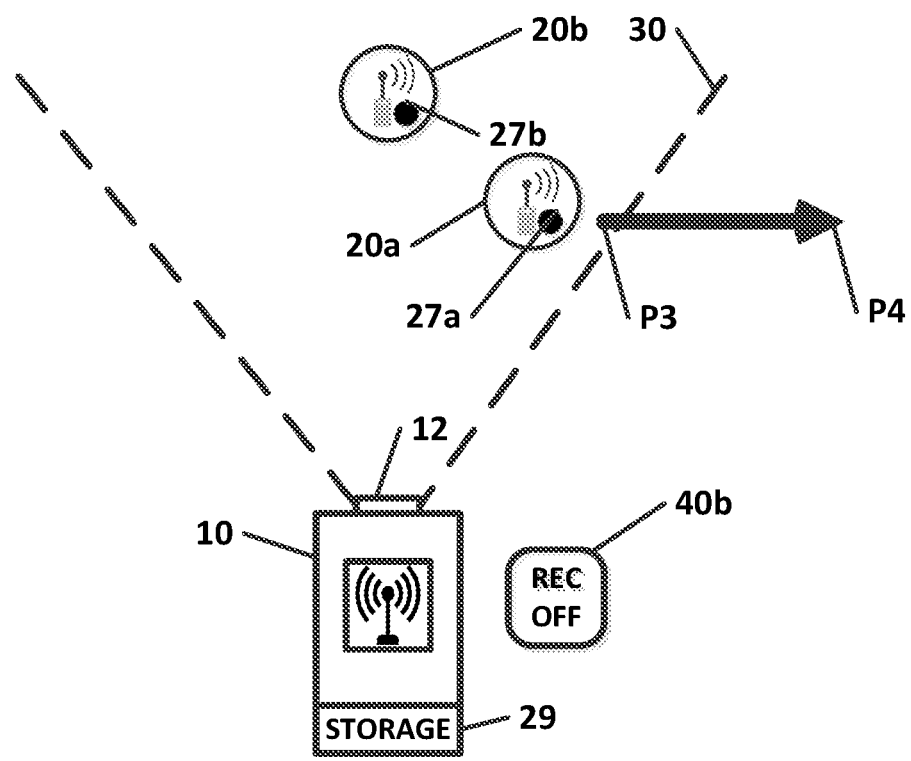

FIGS. 3A and 3B illustrate operations to alter an image capture rate of the image capturing device 10 responsive to comparison of a determined position of a wireless sensor 20 according to embodiments of the present inventive concepts.

Referring to FIG. 3A, a determination may be made at the image capturing device 10 that the first wireless sensor 20a has moved from a first position P1 that is not within a field of view 30 of the image capturing device 10 to a second position P2 that is within the field of view 30 of the image capturing device 10. The image capturing device 10 may make this determination based on a received wireless signal from first wireless sensor 20a as described herein with respect to FIG. 2. The image capturing device 10 may also receive a first unique identification code 27a associated with the first wireless sensor 20a as described herein with respect to FIG. 2. Responsive to determining that the first wireless sensor 20a has moved within view of the lens 12 of the image capturing device 10, the image capturing device 10 may begin storing data from the first wireless sensor 20a within the storage circuit 29 of the image capturing device 10. For example, the image capturing device 10 may store a first timestamp within the storage circuit 29 indicating that the first wireless sensor 20a is within view of the image capturing device 10. The image capturing device 10 may also store an indicator, such as the first unique identification code 27a, that indicates that multimedia data recorded by the image capturing device 10 is associated with the first wireless sensor 20a.

In addition, the image capturing device 10 may alter an image capture rate of the image capturing device 10 to a recording rate 40a. In other words, the image capturing device 10 may transition from a non-recording rate in which multimedia data is not recorded (e.g., an image capture rate of zero) by the image capturing device 10 to a recording rate 40a in which multimedia data is recorded by the image capturing device 10 through lens 12 (e.g., an image capture rate greater than zero). Based on determining that a relevant element (e.g. first wireless sensor 20a) has come within view of the lens 12, the image capturing device 10 may begin recording. The image capturing device 10 may determine that the first wireless sensor 20a is a relevant element to be tracked based on a first unique identification code 27a associated with the wireless sensor 20a. In some embodiments, the image capturing device 10 may determine that the first wireless sensor 20a is a relevant element to be tracked based on a presence of the first unique identification code 27a on a list of registered unique identification codes in the storage circuit 29. As used herein, an image capture rate refers to a rate and/or a manner in which images are captured by the image capturing device 10. For example, the image capture rate may be represented by a number of images recorded per unit time, such as frames/sec, though the present inventive concepts are not limited thereto.

As illustrated in FIG. 3A, second wireless sensor 20b is also within view of the lens 12 of the image capturing device 10. Though within view of the lens 12 of the image capturing device 10, the second wireless sensor 20b may not have caused the image capturing device 10 to transition from the non-recording rate 40b to recording rate 40a because a second unique identification code 27b associated with the second wireless sensor 20b was not registered with the image capturing device 10. In some embodiments, once the image capturing device 10 has transitioned to the recording rate 40a, the image capturing device 10 may determine the relative position of the second wireless sensor 20b and/or store data associated with the second wireless sensor 20b in addition to that of the second wireless sensor 20b. In some embodiments, the image capturing device 10 may only determine the relative position of the second wireless sensor 20b and store data associated with the second wireless sensor 20b if the second wireless sensor 20b contains a unique identification code 27 (see FIG. 1) that has been registered with the image capturing device 10.

Referring to FIG. 3B, a determination may be made at the image capturing device 10 that the first wireless sensor 20a has moved from a third position P3 within the field of view 30 of the image capturing device 10 to a fourth position P4 that is out of the field of view 30 of the lens 12 of the image capturing device 10. The image capturing device 10 may make this determination based on a received wireless signal from first wireless sensor 20a as described herein with respect to FIG. 2. Responsive to determining that the first wireless sensor 20a has moved out of view of the lens 12 of the image capturing device 10, the image capturing device 10 may store a second timestamp within the storage circuit 29 indicating that the first wireless sensor 20a is no longer within view of the image capturing device 10 and stop storing data from the first wireless sensor 20a within the storage circuit 29.

In addition, the image capturing device 10 may alter an image capture rate of the image capturing device 10 to a non-recording rate 40b. In other words, the image capturing device 10 may transition from a recording rate in which multimedia data is recorded by the image capturing device 10 (e.g., an image capture rate greater than zero) to a non-recording rate (e.g., an image capture rate of zero) in which multimedia data is not recorded by the image capturing device 10 through lens 12. Based on determining that the relevant element (e.g. first wireless sensor 20a) has left the view of the lens 12, the image capturing device 10 may stop recording.

As illustrated in FIG. 3B, the second wireless sensor 20b remains in view of the lens 12 of the image capturing device 10 after the first wireless sensor 20a exits the field of view 30. Though within view of the lens 12 of the image capturing device 10, the second wireless sensor 20b may not have caused the image capturing device 10 to remain in recording rate 40a because a unique identification code 27b associated with the second wireless sensor 20b was not registered with the image capturing device 10. In some embodiments, once the image capturing device 10 has transitioned to the non-recording rate 40b, the image capturing device 10 may cease determining the relative position of the second wireless sensor 20b and/or storing data associated with the second wireless sensor 20b.

FIGS. 4A through 7D are similar to those of FIGS. 3A and 3B, differing primarily in the mechanism which triggers the alteration of the state of the image capturing device 10. As such, for convenience, this description will focus on the differences from FIGS. 3A and 3B.

Figure 4A:
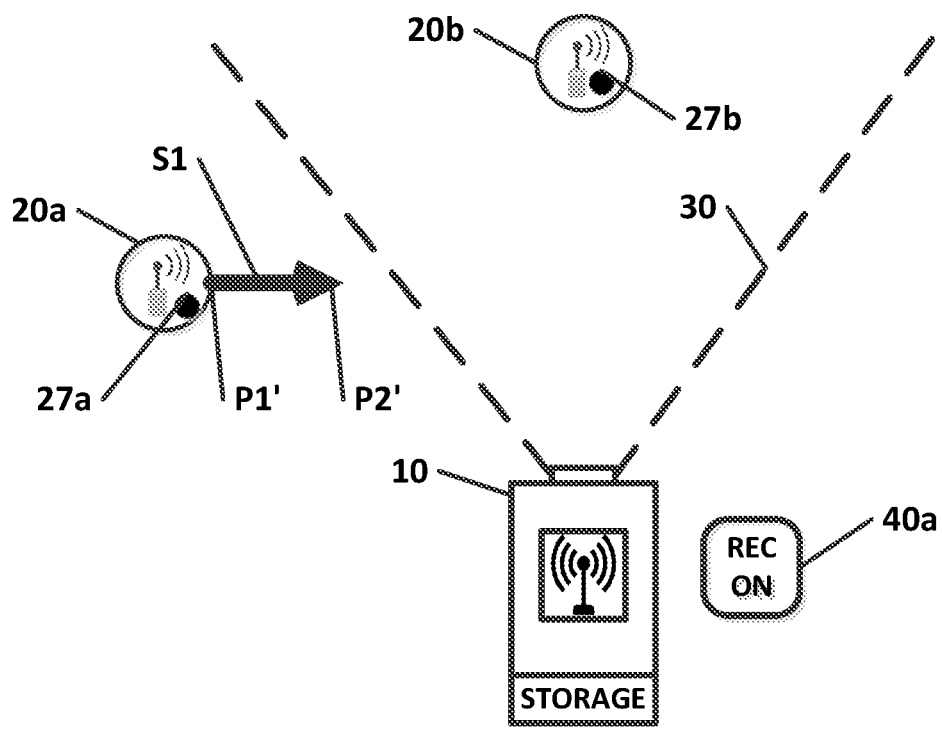
FIGS. 4A and 4B illustrate operations to alter an image capture rate of the image capturing device responsive to comparison of a determined position of a wireless sensor according to embodiments of the present inventive concepts.
Figure 4B:
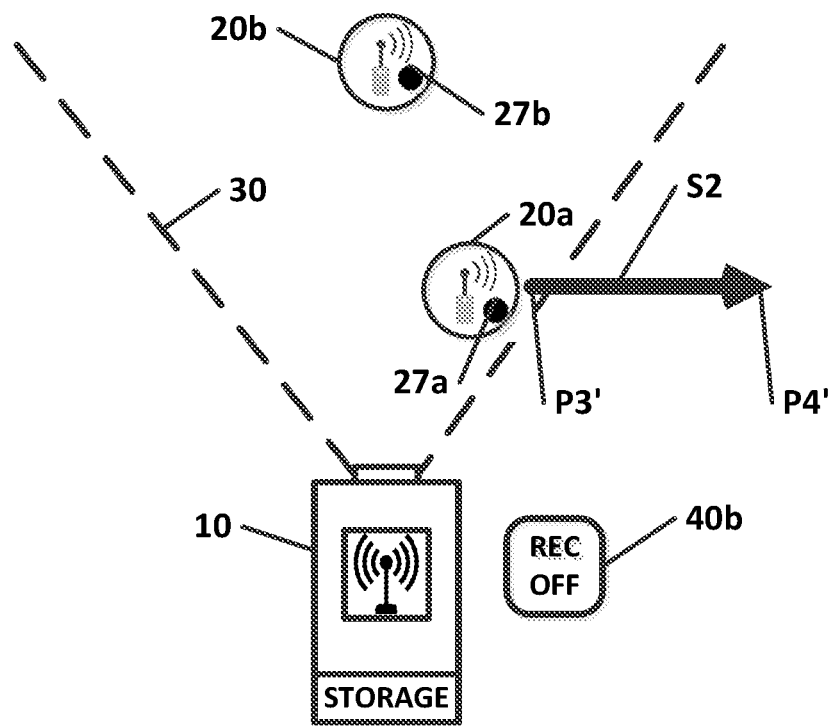

FIGS. 4A and 4B illustrate operations to alter an image capture rate of the image capturing device 10 responsive to comparison of a determined position of a wireless sensor 20 according to embodiments of the present inventive concepts.

Referring to FIG. 4A, a determination may be made at the image capturing device 10 that the first wireless sensor 20a has moved from a first position P1' that is not within a field of view 30 of the image capturing device 10 to a second position P2' that is also not physically within the field of view 30 of the image capturing device 10. The image capturing device 10 may also make a determination that the first wireless sensor 20a is moving at a speed S1. In some embodiments, the determination of the speed S1 may be made based on a time between the first and second positions P1' and P2'. In some embodiments, the speed S1 may be determined based on data received from the first wireless sensor 20a. Responsive to determining, based on the speed S1, that the first wireless sensor 20a will move within view of the lens 12 of the image capturing device 10 within a threshold period of time, the image capturing device 10 may begin storing data (e.g., an image capture rate greater than zero) from the first wireless sensor 20a within the storage circuit 29 of the image capturing device 10 and/or may alter (e.g., increase) the image capture rate of the image capturing device 10 to the recording rate 40a. In other words, the image capturing device 10 may begin recording multimedia data a certain threshold in advance of the first wireless sensor 20a coming physically within the field of view 30 of the image capturing device 10.

Referring to FIG. 4B, a determination may be made at the image capturing device 10 that the first wireless sensor 20a has moved from a third position P3' that is within a field of view 30 of the image capturing device 10 to a second position P4' that is not physically within the field of view 30 of the image capturing device 10. The image capturing device 10 may also make a determination that the first wireless sensor 20a is moving at a speed S2. Responsive to the determined speed S2, the image capturing device 10 may wait a threshold of time before ceasing the storage of data from the first wireless sensor 20a within the storage circuit 29 of the image capturing device 10 and/or altering the image capture rate (e.g. decreasing) of the image capturing device 10 to the non-recording rate 40b. In other words, the image capturing device 10 may cease recording multimedia data a certain threshold of time after of the first wireless sensor 20a physically leaves the field of view 30 of the image capturing device 10.

Figure 5A:
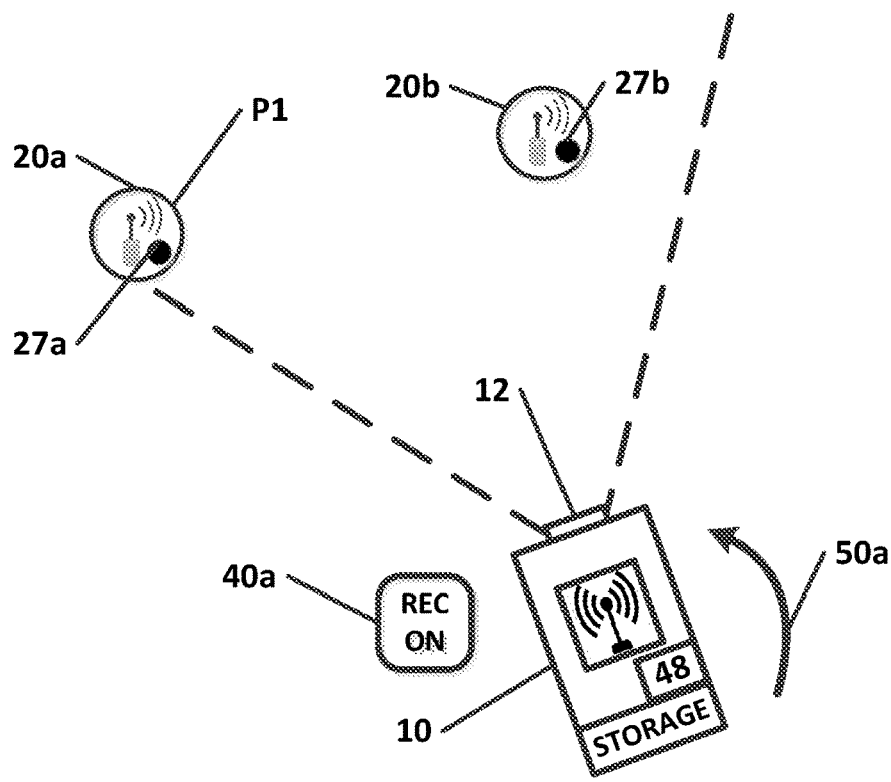
FIGS. 5A and 5B illustrate operations to electronically control a position of the image capturing device responsive to comparison of a determined position of a wireless sensor according to embodiments of the present inventive concepts.
Figure 5B:
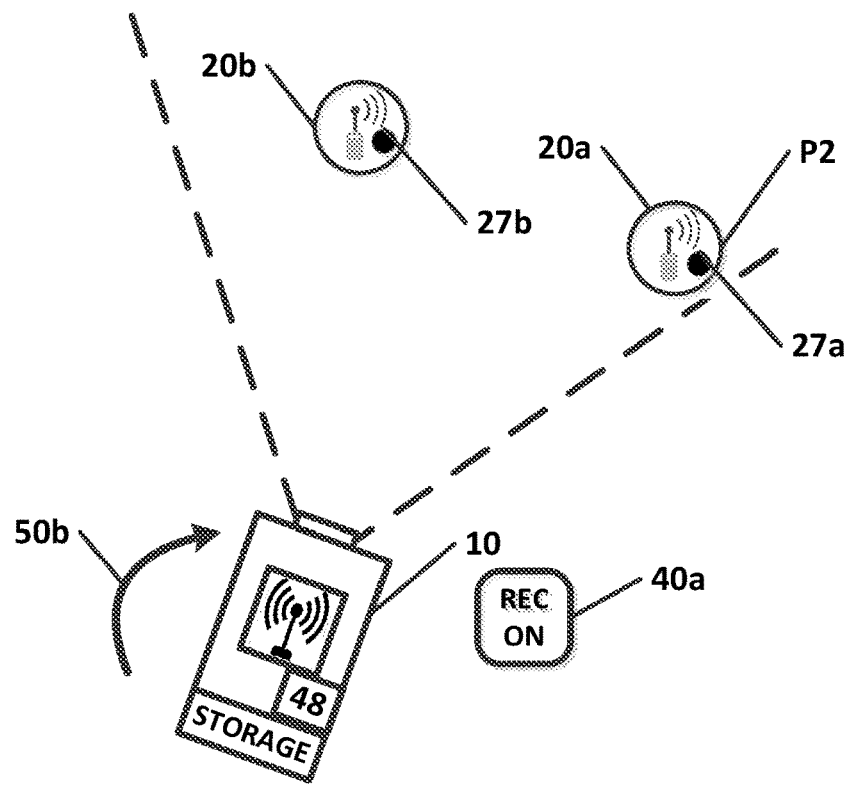

FIGS. 5A and 5B illustrate operations to electronically control a position and/or orientation of the image capturing device 10 responsive to comparison of a determined position of a wireless sensor 20 according to embodiments of the present inventive concepts.

FIG. 5A illustrates an embodiment of the present inventive concepts in which the image capturing device 10 is coupled to a movement circuit 48 configured to alter a position and/or orientation of the image capturing device 10 responsive to an electronic signal. In some embodiments, altering a position of the image capturing device 10 may include physically moving and/or displacing the image capturing 10 device from a first position to a second position. In some embodiments, altering an orientation of the image capturing device 10 may include rotating and/or pivoting the image capturing device 10. In some embodiments, altering an orientation of the image capturing device 10 may include altering a position and/or orientation of the lens 12 of the image capturing device 10, without physically changing the position of the image capturing device 10.

Referring to FIG. 5A, a determination may be made at the image capturing device 10 that the first wireless sensor 20a is present at a first position P1 that is not within a field of view 30 of the image capturing device 10. Responsive to this determination, the movement circuit 48 of the image capturing device 10 may perform movement operation 50a to alter a position and/or orientation of the lens 12. The movement operation 50a may place the position P1 of the first wireless sensor 20a within the field of view 30 of the image capturing device 10. The image capturing device 10 may change or maintain an image capture rate of the image capturing device 10 at the recording rate 40a. Thus, the image capturing device 10 may adjust the lens 12 to place the first wireless sensor 20a within view of the image capturing device 10 so as to be recorded.

As illustrated in FIG. 5A, the second wireless sensor 20b is within view of the lens 12 of the image capturing device 10 (e.g. within a field of view 30 of the lens 12 of the image capturing device 10). Though within view of the lens 12 of the image capturing device 10, the image capturing device 10 may adjust the lens 12 away from the second wireless sensor 20b based on the second unique identification code 27b associated with the second wireless sensor 20b.

In some embodiments, the image capturing device 10 may change a position and/or orientation away from the second wireless sensor 20b towards the first wireless sensor 20a because the second wireless sensor 20b was not registered with the image capturing device 10. In some embodiments, the image capturing device 10 may change a position and/or orientation away from the second wireless sensor 20b towards the first wireless sensor 20a because the second wireless sensor 20b has a lower priority than the first wireless sensor 20a. That is to say that registered unique identification codes (e.g. unique identification codes 27a and/or 27b) stored on the image capturing device 10 may be prioritized (e.g. have an associated priority) so as to give priority to certain wireless sensors (e.g. first wireless sensor 20a) over others (e.g. second wireless sensor 20b). In some embodiments, the priority may be related to which wireless sensor out of a plurality of wireless sensors shall be recorded. In some embodiments, the priority may indicate which wireless sensor out of a plurality of wireless sensors shall be recorded when it is possible to record more than one wireless sensor. For example, both the first wireless sensor 20a and the second wireless sensor 20b may have registered unique identification codes 27a and 27b with the image capturing device 10. However, the first wireless sensor 20a may have a higher priority to be recorded than the second wireless sensor 20b. As such, the image capturing device 10 may begin recording based on a determination that the second wireless sensor 20b has moved within the field of view 30 of image capturing device 10, but may change position and/or orientation of the image capturing device 10 based on a determination that first wireless sensor 20a with a higher priority is within proximity of the image capturing device 10.

Referring to FIG. 5B, the movement circuit 48 of the image capturing device 10 may continue altering a position and/or orientation of the image capturing device 10 to track the first wireless sensor 20a. The image capturing device 10 may continue to record data from both first and second wireless sensors 20a and 20b, and may continue determining positions of both first and second wireless sensors 20a and 20b. Based on a determination by the image capturing device 10 that the first wireless sensor 20a can remain in view if the position and/or orientation of the image capturing device 10 is altered, the movement circuit 48 may perform movement operation 50B to alter the position and/or orientation of the image capturing device 10 to place the first wireless sensor 20a within the field of view 30 of the image capturing device 10.

Figure 6A:
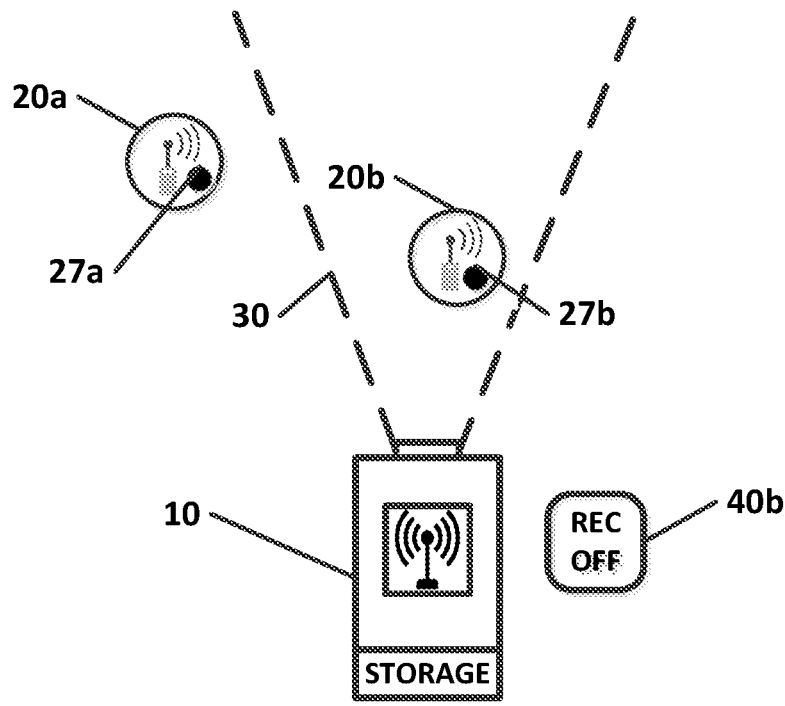
FIGS. 6A and 6B illustrate operations to alter a field of view of the image capturing device responsive to comparison of a determined position of a wireless sensor according to embodiments of the present inventive concepts.
Figure 6B:
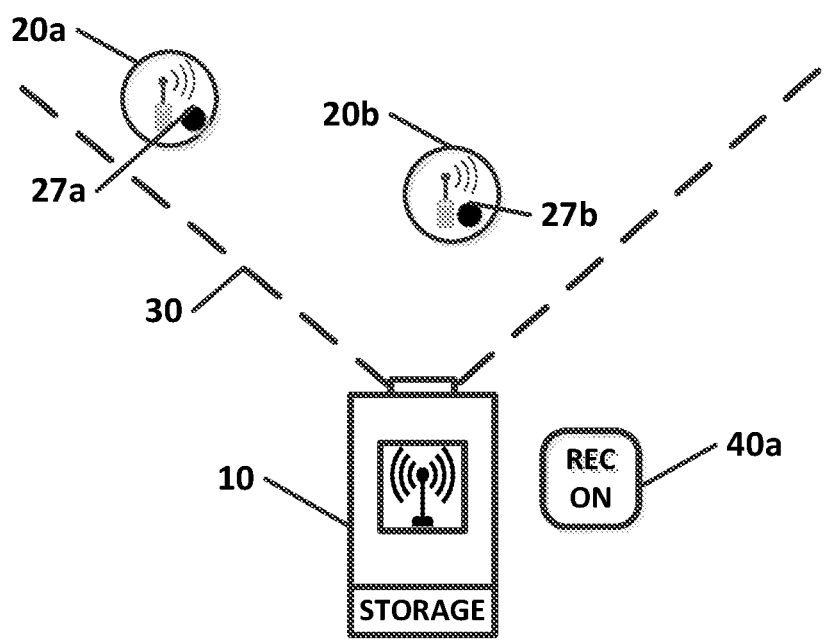

FIGS. 6A and 6B illustrate operations to alter a field of view 30 of the image capturing device 10 responsive to comparison of a determined position of a wireless sensor 20 according to embodiments of the present inventive concepts.

In some embodiments, the image capturing device 10 may be configured to alter the field of view 30 of the image capturing device 10. For example, the image capturing device 10 may be capable of performing a zoom operation or other configuration change to expand or contract the field of view 30 of the image capturing device 10.

As illustrated in FIG. 6A, the image capturing device 10 may determine that a first position P1 of the first wireless sensor 20a is outside a current field of view 30 of the image capturing device 10. As a result, the image capturing device 10 may be in the non-recording rate 40b because the first wireless sensor 20a is not within view of the image capturing device 10. The image capturing device 10 may determine that the first wireless sensor 20a may be placed within the view of the image capturing device 10 by expanding the field of view 30 of the image capturing device 10.

As illustrated in FIG. 6B, the image capturing device 10 may perform an operation to expand the field of view 30 to include the first wireless sensor 20a. For example, the image capturing device 10 may perform an operation to zoom out the image captured by the image capturing device 10. As a result of this operation, the first wireless sensor 20a may be within the field of view 30 of the image capturing device 10 and the image capture rate of the image capturing device 10 may be changed from a non-recording rate 40b to a recording rate 40a. Thus, the image capturing device 10 may change its field of view 30 to place the first wireless sensor 20a within view of the image capturing device 10 and begin recording.

FIGS. 7A-7D illustrate operations to change an image capture rate of the image capturing device 10 by altering image capture rates of the image capturing device 10 responsive to comparison of a determined position of a wireless sensor 20 according to embodiments of the present inventive concepts.

Figure 7A:
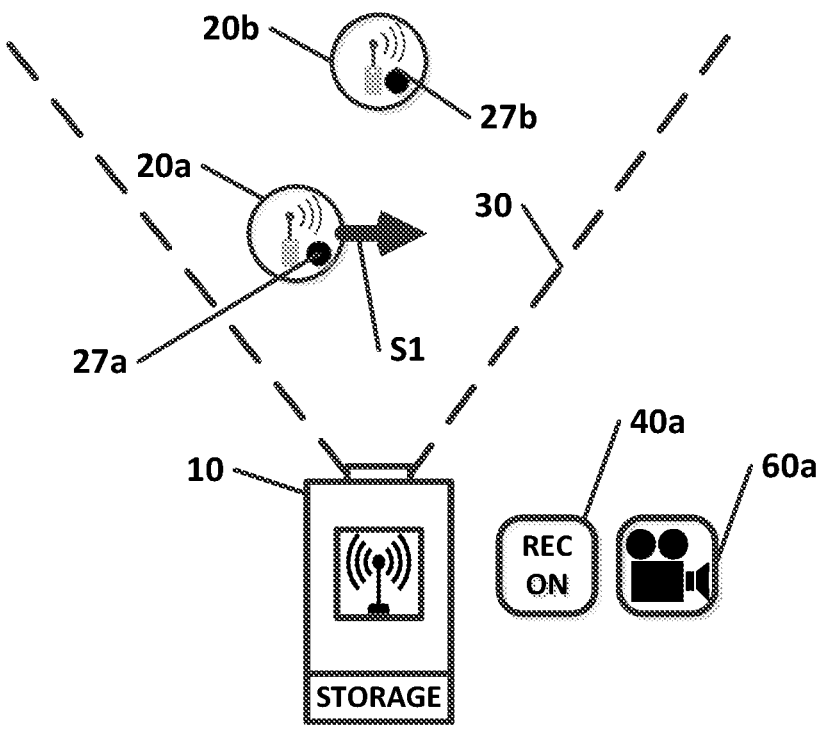
FIGS. 7A-7D illustrate operations to change an image capture rate of the image capturing device by altering image capture rates of the image capturing device responsive to comparison of a determined position of a wireless sensor according to embodiments of the present inventive concepts.

Referring to FIG. 7A, the image capturing device 10 may be in a recording rate 40a based on a determination that the first wireless sensor 20a is within the field of view 30 of the image capturing device 10. The image capturing device 10 may additionally determine a speed S1 of the first wireless sensor 20A. Based on a determination that the first wireless sensor 20a is moving (e.g. S1>0) and/or that the first wireless sensor 20a is moving at a speed greater than a first threshold, the image capturing device 10 may enter a video recording rate 60a. Thus, the image capturing device 10 may use video to record objects that are moving and/or moving faster than a first threshold.

Figure 7B:
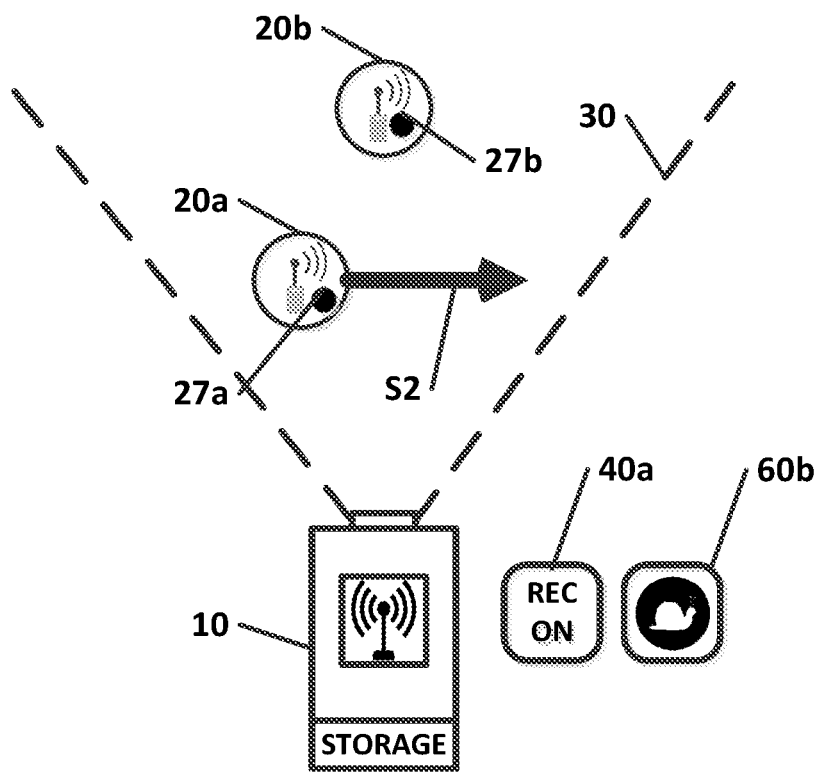

Referring to FIG. 7B, the image capturing device 10 may determine a speed S2 of the first wireless sensor 20A. Based on a determination that the first wireless sensor 20a is moving at a speed greater than a second threshold, the image capturing device 10 may enter a slow motion video recording rate 60b. In some embodiments, the second threshold may be faster than the first threshold. In some embodiments, slow motion video rate 60b may include a higher frame rate (e.g., a higher image capture rate). In some embodiments, regular video rate 60a may record at, for example, 24 frames-per-second, 25 frames-per-second, or 30 frames-per-second, though the present inventive concepts are not limited thereto. In some embodiments, slow motion video rate 60b may record at, for example, 48 frames-per-second, 60 frames-per-second, 120 frame-per-second, or 300 frame-per-second though the present inventive concepts are not limited thereto. Thus, the image capturing device 10 may use slow motion video to record objects that are moving faster than a second threshold in which regular speed video might lack detail.

Figure 7C:
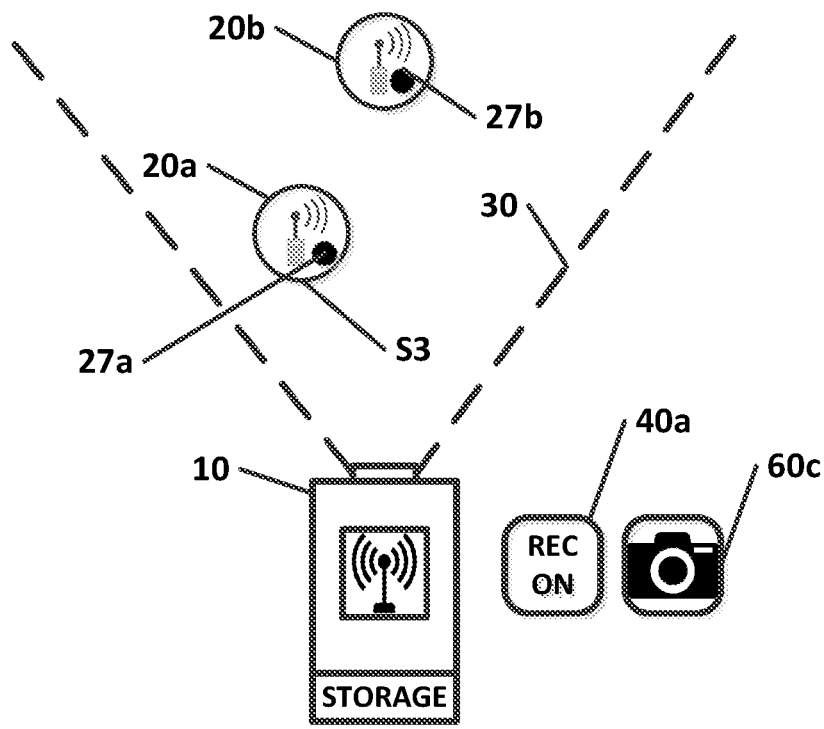

Referring to FIG. 7C, the image capturing device 10 may be in a recording rate 40a based on a determination that the first wireless sensor 20a is within the field of view 30 of the image capturing device 10. The image capturing device 10 may additionally determine a speed S3 of the first wireless sensor 20A. Based on a deter initiation that the first wireless sensor 20a is stationary (e.g. S3=0) and/or that the first wireless sensor 20a is moving at a speed slower than a third threshold, the image capturing device 10 may enter a still photo rate 60c. Thus, the image capturing device 10 may use still images (e.g., photo) to record objects that are stationary so as to provide greater photo detail.

Figure 7D:
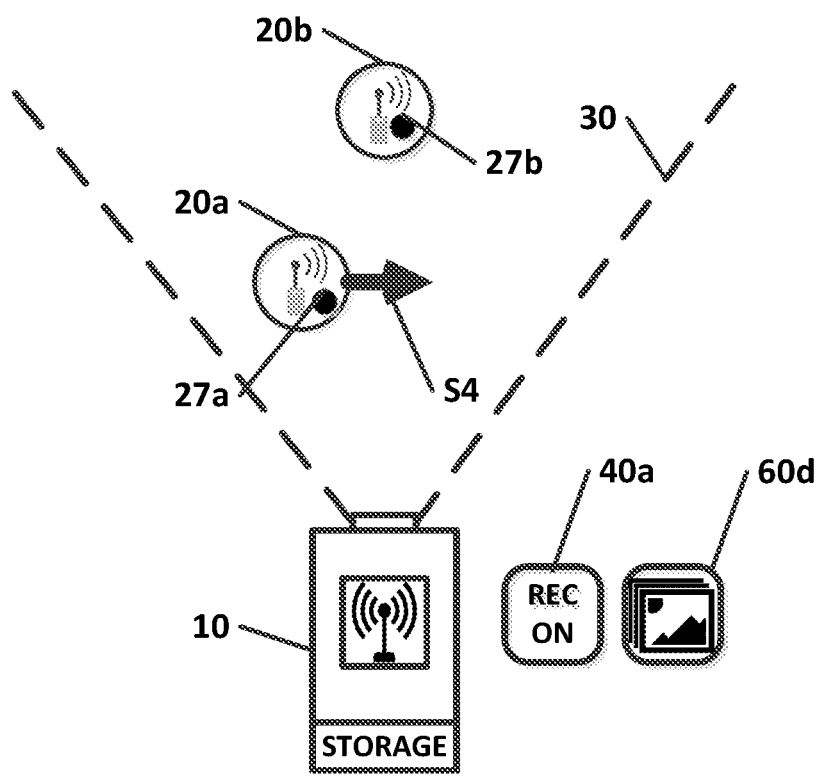

Referring to FIG. 7D, the image capturing device 10 may determine a speed S4 of the first wireless sensor 20A. Based on a determination that the first wireless sensor 20a is moving at a speed greater than the third threshold, the image capturing device 10 may enter a burst photo rate 60d. Burst photo rate 60d may include the image capturing device 10 taking multiple photos per second. Thus, the image capturing device 10 may use photo sequences to capture higher-quality of images of objects that are moving.

Though FIGS. 7A-7D describe altering image capture rates between photo and video based solely on speed, it will be understood that other options are possible. For example, the image capturing device 10 may select between image capture rates associated with rates 60a-d based on the number of wireless sensors 20 within view of the image capturing device 10. As described and illustrated herein, more than one wireless sensor 20 may be in view of the image capturing device 10. In some embodiments, the image capture rate may be solely or additionally based on the number of wireless sensors 20 within view of the image capturing device 10.

For example, in some embodiments, the image capturing device 10 may use a photo rate (e.g. rates 60c and 60d) when there are multiple wireless sensors 20 in view of the image capturing device 10 that are moving at a relatively slow speed. In some embodiments, the image capturing device 10 may use the still photo rate 60c when there is more than one wireless sensor 20 (e.g., a plurality of wireless sensors 20) in view of the image capturing device 10 that are stationary or moving very slowly. In some embodiments, the image capturing device 10 may use the burst photo rate 60d when there is more than one wireless sensor 20 in view of the image capturing device 10 that are moving more quickly.

In some embodiments, the image capturing device 10 may use a video rate (e.g. rates 60a and 60b) when there are fewer wireless sensors 20, or one wireless sensor 20, in view of the image capturing device 10 that are moving relatively quickly. In some embodiments, the image capturing device 10 may use the regular video rate 60a when there is a single wireless sensor 20 in view of the image capturing device 10 that is moving quickly. In some embodiments, the image capturing device 10 may use the slow motion video rate 60b when there is a single wireless sensor 20 in view of the image capturing device 10 that is moving very quickly.

Though various criteria have been described with respect to differentiating between video and photo rate, it will be understood that other combinations of criteria are possible without deviating from the scope of the present inventive concepts. For example, in some embodiments, a user of the image capturing device 10 may switch between video and photo rates based on input, such as the pressing of a physical button or providing a voice command, and additional choices (e.g. regular video rate 60a vs. slow motion video rate 60b, and/or regular photo rate 60c vs. burst photo rate 60d) may be made based solely on determined speed.

Figure 8A:
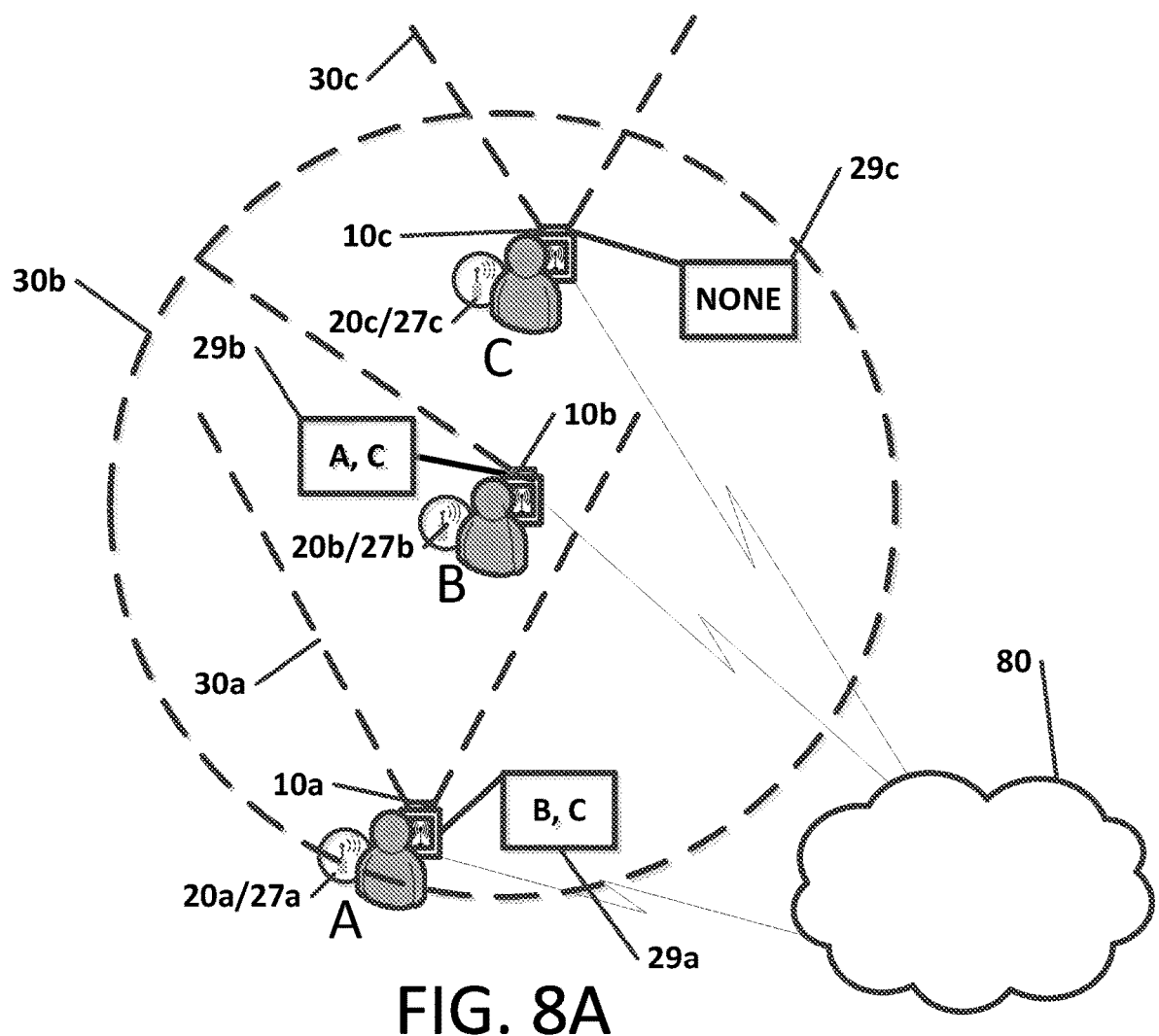
FIGS. 8A and 8B illustrate examples of an operation of an image capturing device according to embodiments of the present inventive concepts.
Figure 8B:
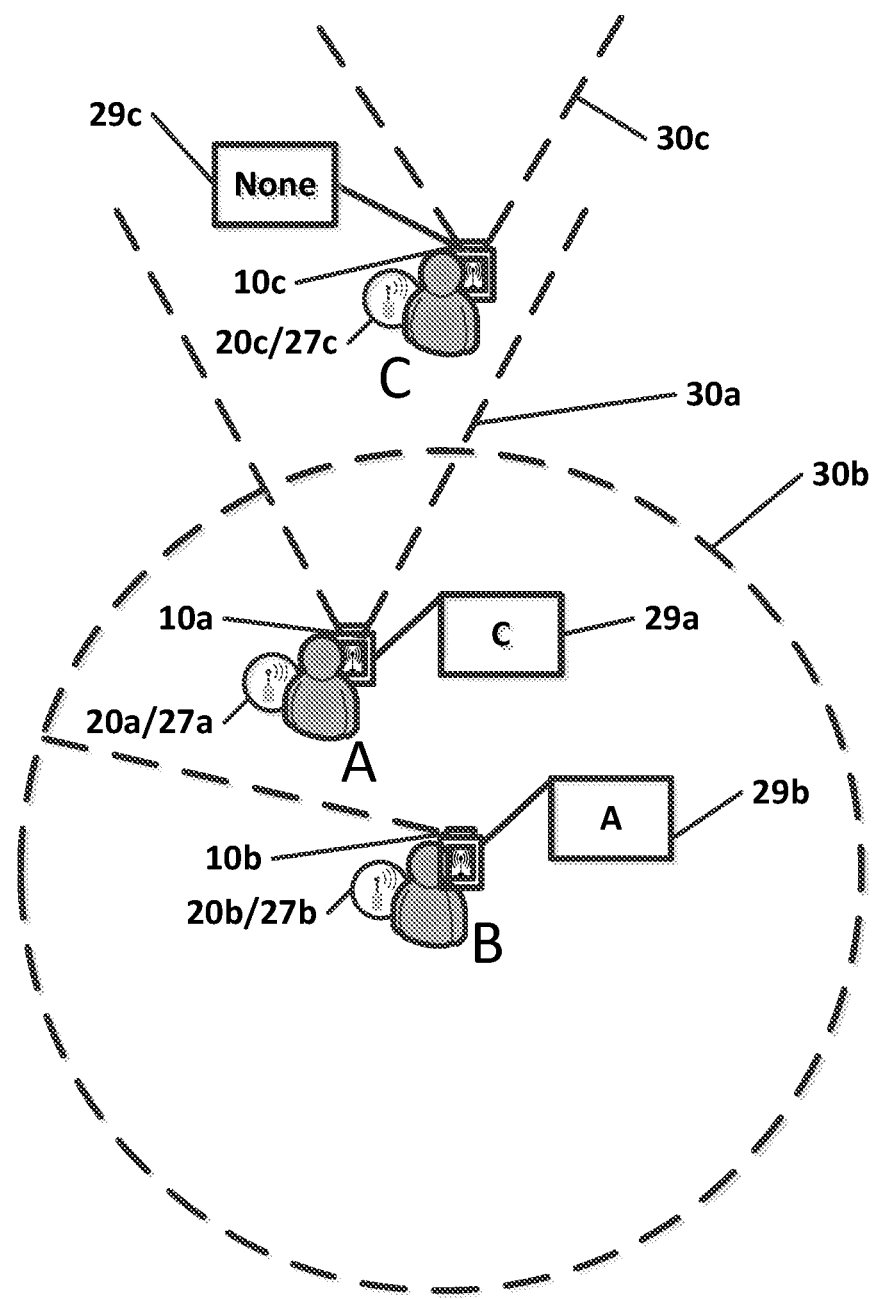

FIGS. 8A and 8B illustrate examples of an operation of an image capturing device 10 according to embodiments of the present inventive concepts.

The example of FIGS. 8A and 8B illustrate three users A, B, C that each have an image capturing device 10 as described herein. User A has an image capturing device 10a having a field of view 30a. User B has an image capturing device 10b having a field of view 30b. As shown in FIG. 8A, image capturing device 10b is a 360 degree camera with a field of view 30b surrounding User B. User C has an image capturing device 10c having a field of view 30c. In addition, wireless sensors 20a, 20b, 20c may be coupled to each of the users A, B, C, respectively. The wireless sensors 20a, 20b, 20c may have unique identification codes 27a, 27b, and 27c respectively.

In some embodiments, one or more of the image capturing devices 10a, 10b, 10c may be connected via a network 80. The network 80 may be created wirelessly periodically and/or continuously between respective ones of the image capturing devices 10a, 10b, 10c so as to share configuration information using the communication circuit 23 (see FIG. 1). The network 80 may not, in some embodiments, be maintained permanently. For example, the network 80 may be an ad-hoc network that is briefly established to share configuration information between the image capturing devices 10a, 10b, 10c and then torn down. The configuration information may include registration information including unique identification codes 27a, 27b, and 27c. Thus, users A, B, and C may share a list of unique identification codes 27a, 27b, and 27c registered to be tracked. For example, one or more of the image capturing devices 10a, 10b, 10c may communicate via near field communication (NFC) to share registration information. In some embodiments, the image capturing devices 10a, 10b, 10c may also synchronize their respective internal clocks over the network 80 so that timestamps recorded by the image capturing devices 10a, 10b, 10c will be accurate with respect to one another.

Referring to FIG. 8A, in a first physical configuration of the users A, B, and C each of the image capturing devices 10a, 10b, and 10c have different views and, thus, according to embodiments of the present inventive concepts, store different wireless sensor data associated with recorded multimedia data.

For example, as illustrated in FIG. 8A, User A may have both User C and User B within field of view 30a of the image capturing device 10a. Consequently, image capturing device 10a may store additional wireless sensor data associated with wireless sensor 20b and 20c within the storage circuit 29a of image capturing device 10a. The additional sensor data may include the unique identification codes 27b and 27c, as well as timestamps associated with when the wireless sensors 20b and 20c were within view of the image capturing device 10a.

As further illustrated in FIG. 8A, the 360 degree image capturing device 10b of User B may have both User C and User A within field of view 30b of the image capturing device 10*b*. Consequently, image capturing device 10*b* may store additional wireless sensor data associated with wireless sensor 20*a* and 20*c* within the storage circuit 29*b* of image capturing device 10*b*. The additional sensor data may include the unique identification codes 27*a* and 27*c*, as well as timestamps associated with when the wireless sensors 20*a* and 20*c* were within view of the image capturing device 10*b*.

As further illustrated in FIG. 8A, the image capturing device 10*c* of User C has no wireless sensors within the field of view 30*c* of the image capturing device 10*c*. Consequently, the image capturing device 10*c* may not be recording. In some embodiments, the image capturing device 10*c* may be recording multimedia data, but no additional sensor data associated with wireless sensors may be stored in the storage circuit 29*c* of image capturing device 10*c*.

FIG. 8B illustrates a second physical configuration of the users A, B, and C. The second configuration may result from a natural movement of the users A, B, and C. For example, users A, B, C may change positions based on User A skiing past User B while recording using their image capturing devices 10*a*, 10*b*, and 10*c*.

As illustrated in FIG. 8B, User A may now only have both User C within field of view 30*a* of the image capturing device 10*a*. Consequently, image capturing device 10*a* may stop storing additional sensor data associated with wireless sensor 20*b* and continue storing additional sensor data associated with wireless sensor 20*c* within the storage circuit 29*a*.

As further illustrated in FIG. 8B, the 360 degree image capturing device 10*b* of User B may now only have User A within field of view 30*b* of the image capturing device 10*b*. Consequently, image capturing device 10*b* may stop storing additional sensor data associated with wireless sensor 20*c* and continue storing additional sensor data associated with wireless sensor 20*a* within the storage circuit 29*b*.

As further illustrated in FIG. 8B, the image capturing device 10*c* of User C still has no wireless sensors within the field of view 30*c* of the image capturing device 10*c*. Consequently, the image capturing device 10*c* may not be recording. In some embodiments, the image capturing device 10*c* may be recording multimedia data, but no additional data associated with wireless sensors may be stored in the storage circuit 29*c* of image capturing device 10*c*.

Figure 9:
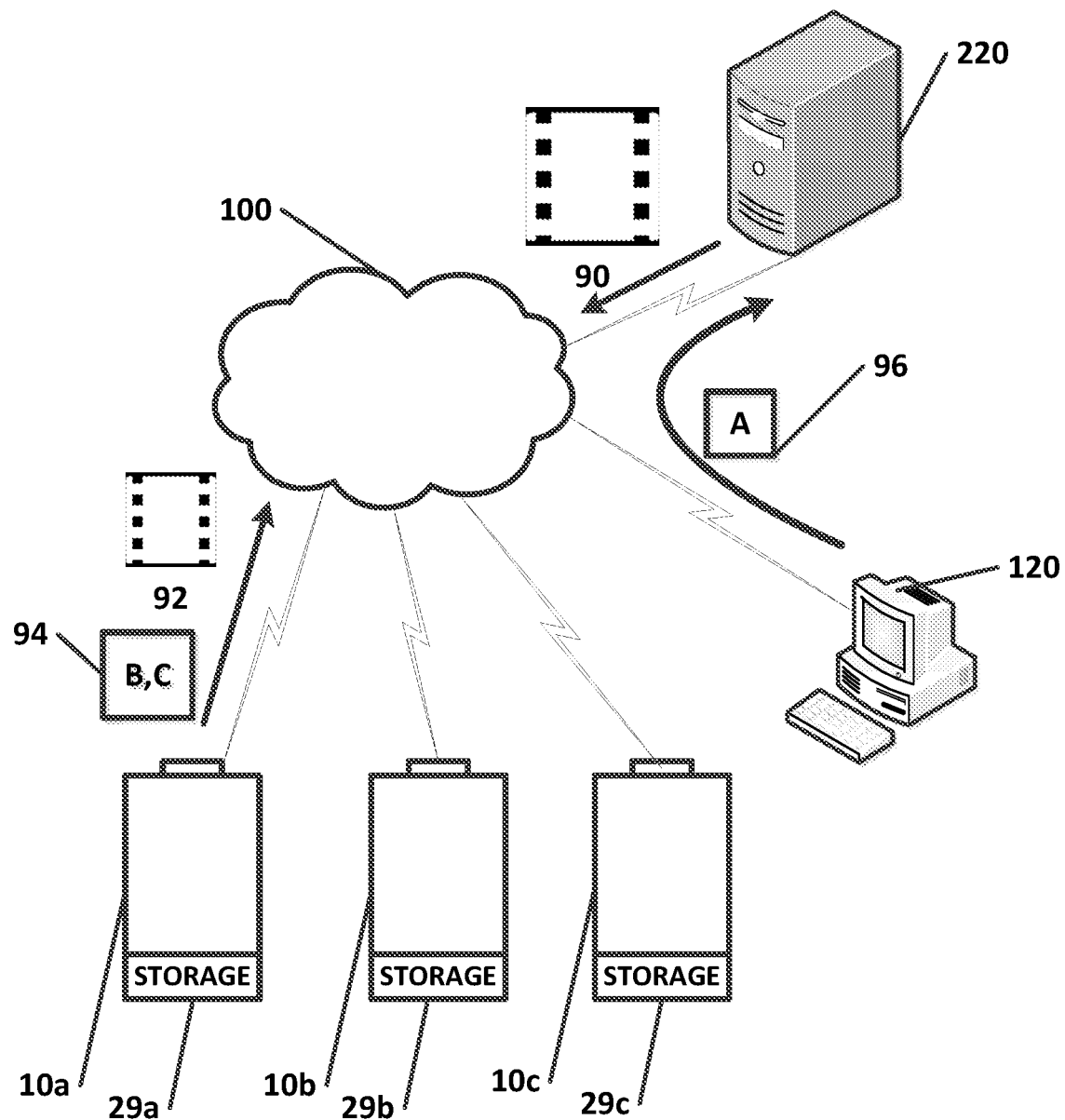
FIG. 9 illustrates the transfer of multimedia data and wireless sensor data from image capturing devices to a server according to embodiments of the present inventive concepts.

FIG. 9 illustrates the transfer of multimedia data and wireless sensor data from image capturing devices 10 to a server 220 according to embodiments of the present inventive concepts.

As illustrated in FIG. 9, a plurality of image capturing devices 10*a*, 10*b*, 10*c* may connect to server 220 through network 100 that may comprise any conventional public and/or private, real and/or virtual wired and/or wireless network including the Internet. In some embodiments, the network 100 may be a large network such as the global network more commonly known as the Internet. The image capturing devices 10*a*, 10*b*, 10*c* may connect to the network 100 using a communication circuit 23 (see FIG. 1) and/or other commonly-understood electronic communication mechanisms.

As illustrated and described herein, each image capturing device of the image capturing devices 10*a*, 10*b*, and 10*c* may contain recorded multimedia data 92 and additional data 94 associated with wireless sensors. The additional data 94 may be stored within respective storage circuits 29*a*, 29*b*, and 29*c*. The recorded multimedia data 92 and the additional data 94 associated with the wireless sensors may be transferred over network 100 to server 220. Though FIG. 9 illustrates only image capturing device 10*a* transferring additional data 94 and recorded multimedia data 92 to the server 220, it will be understood that each image capturing device 10*a*, 10*b*, 10*c* may be capable of transferring respective additional data 94 and recorded multimedia data 92. The additional data 94 and recorded multimedia data 92 of each image capturing device 10*a*, 10*b*, 10*c* may be different from one another, based on the particular perspective of the image capturing device 10*a*, 10*b*, 10*c* which recorded the multimedia data.

The server 220 may process the recorded multimedia data 92 using the additional data 94 associated with the wireless sensors to provide compiled multimedia data 90. The server 220 may include tablets and/or smart phones, laptop and/or desktop computers and/or any other user terminal, and may be embodied by one or more enterprise, application, personal, pervasive and/or embedded computers, such as a desktop, notebook, net book, laptop, smart phone, electronic book reader and/or any other embedded device. The compiled multimedia data 90 may be generated based on one or more particular unique identification codes provided as input 96 to the server 220. In some embodiments, the one or more unique identification codes may be provided as input 96 to the server 220 by input from a user 120 over the network 100.

The compiled multimedia data 90 may be a compilation of segments of recorded multimedia data 92 that are associated with the one or more unique identification codes provided as input 96 to the server 220.

For example, the server 220 may receive multimedia data 92 including respective segments associated with different wireless sensors. In some embodiments, when a segment of multimedia data is associated with a particular wireless sensor, it may mean that a person wearing a particular wireless sensor is recorded within the segment of multimedia data. The additional data 94 associated with the wireless sensors provided to the server 220 may indicate which time periods of the segments of the recorded multimedia data 92 are associated with which wireless sensors. For example, the additional data 94 may indicate that a first time period of the recorded multimedia data 92 was recorded when a first wireless sensor (e.g. first wireless sensor 20*a*, FIGS. 3A-7D) was visible within the recorded multimedia data 92. The additional data 94 may also indicate that a second time period of the recorded multimedia data 92 was recorded when a second wireless sensor (e.g. wireless sensor 20*b*, FIGS. 3A-7D) was visible within the recorded multimedia data 92. Accordingly, the server 220 may be able to determine which wireless sensors are associated with time periods of the recorded multimedia data 92

In some embodiments, the server 220 may receive input 96 indicating a particular wireless sensor. In some embodiments, the input 96 may be the unique identification code 27 (see FIG. 1) of the wireless sensor. In some embodiments, the input 96 may be some other designation which the server 220 may use to map the input 96 to a particular wireless sensor. Responsive to the input 96, the server 220 may be able to generate compiled multimedia data 90 from the provided recorded multimedia data 92. The compiled multimedia data 90 may consist of primarily and/or only portions of the recorded multimedia data 92 that are associated with the wireless sensor identified by the provided input 96

Figure 10:
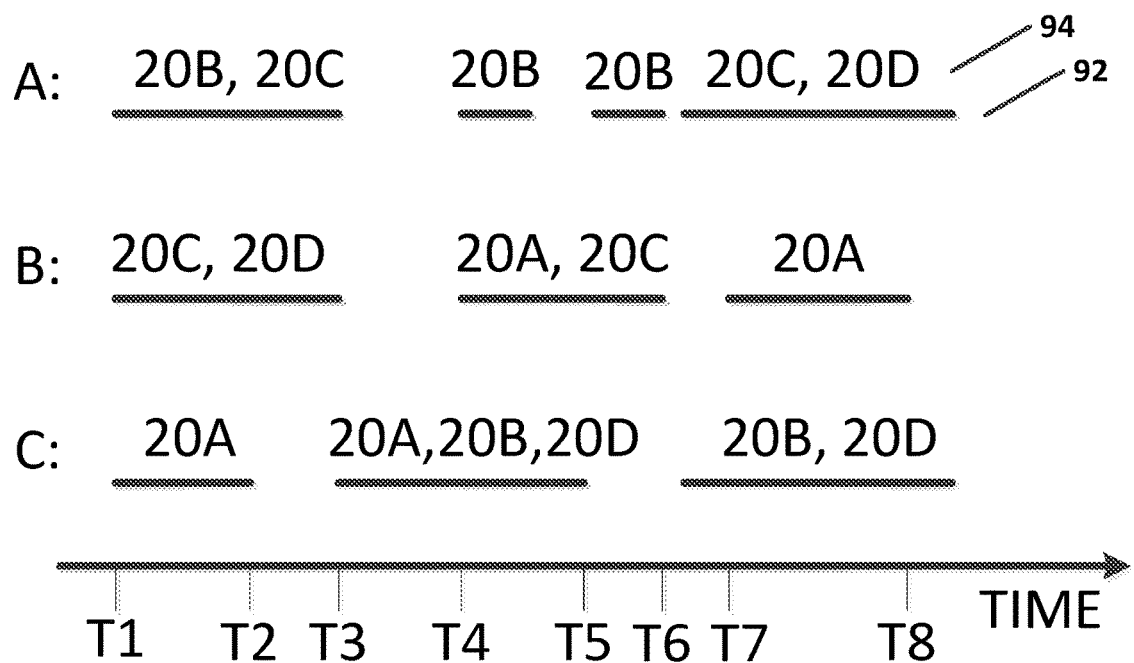
FIG. 10 illustrates an embodiment of received recorded multimedia data and additional data according to embodiments of the present inventive concepts.

FIG. 10 illustrates an embodiment of received recorded multimedia data 92 and additional data 94 according to embodiments of the present inventive concepts.

The server 220 may be provided with recorded multimedia data 92 and additional data 94 from three different users A, B, and C, according to recordings made by, for example, by image capturing devices 10a, 10b, 10c (see FIG. 9). As described herein, the respective additional data 94 may include descriptions of wireless sensors which are visible to the image capturing device when the recorded multimedia data 92 was recorded.

As illustrated in FIG. 10, User A may provide four segments of recorded multimedia data 92. The first segment may be recorded video that is associated with two wireless sensors, 20B and 20C. As described herein, a wireless sensor identified as 20B may have a unique identification code 27 (see FIG. 1) that identifies user B. The next two segments may be still photos that are associated with wireless sensor 20B. The fourth segment may be recorded video that is associated with two wireless sensors, 20C and 20D.

As illustrated herein, wireless sensor 20D may be a wireless sensor that was an unregistered wireless sensor. In other words, wireless sensor 20D may be a wireless sensor captured while User A was filming User C responsive to detecting wireless sensor 20C associated with User C. In some embodiments, as described herein, the image capturing device 10 may record data associated with an unregistered wireless sensor (e.g. wireless sensor 20D) when a registered wireless sensor (e.g. wireless sensor 20C) is being recorded.

Referring again to FIG. 10, User B may provide 3 segments of recorded multimedia data 92. The first segment may be recorded video that is associated with two wireless sensors, 20C and 20D. The second segment may be recorded video that is associated with wireless sensors 20A and 20C. The third segment may be recorded video that is associated with wireless sensor 20A.

Figure 12:
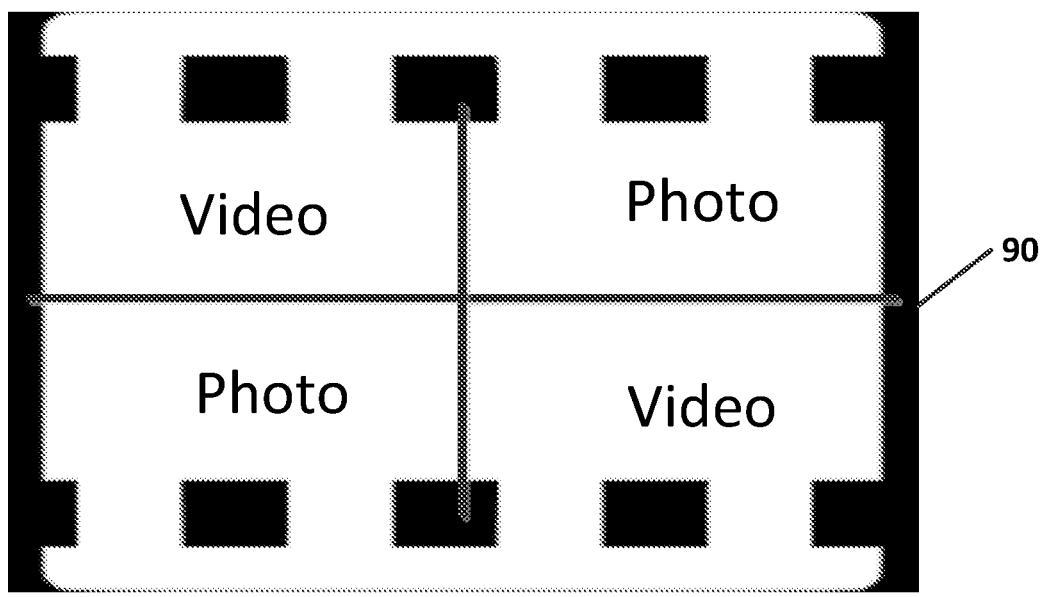
FIG. 12 illustrates an example embodiment of the present inventive concepts in which photo and video segments may be combined in compiled multimedia data.

As also illustrated in FIG. 12, User C may provide 3 segments of recorded multimedia data 92. The first segment may be recorded video that is associated with wireless sensor 20A. The second segment may be recorded video that is associated with wireless sensors 20A, 20B, and 20D. The third segment may be recorded video that is associated with wireless sensors 20B and 20D.

The additional data 94 provided may also include timestamps for each of the received recorded multimedia data 92. The timestamps may identify time periods of the various segments of recording multimedia data 92 that are associated with specific wireless sensors. The server 220 may use these timestamps to create compiled multimedia data 90. For example, the additional data 94 provided by User A may identify that the first segment of recorded multimedia data 92 associated with wireless sensors 20B and 20C begins at timestamp T1 and continues to timestamp T3.

Figure 11:
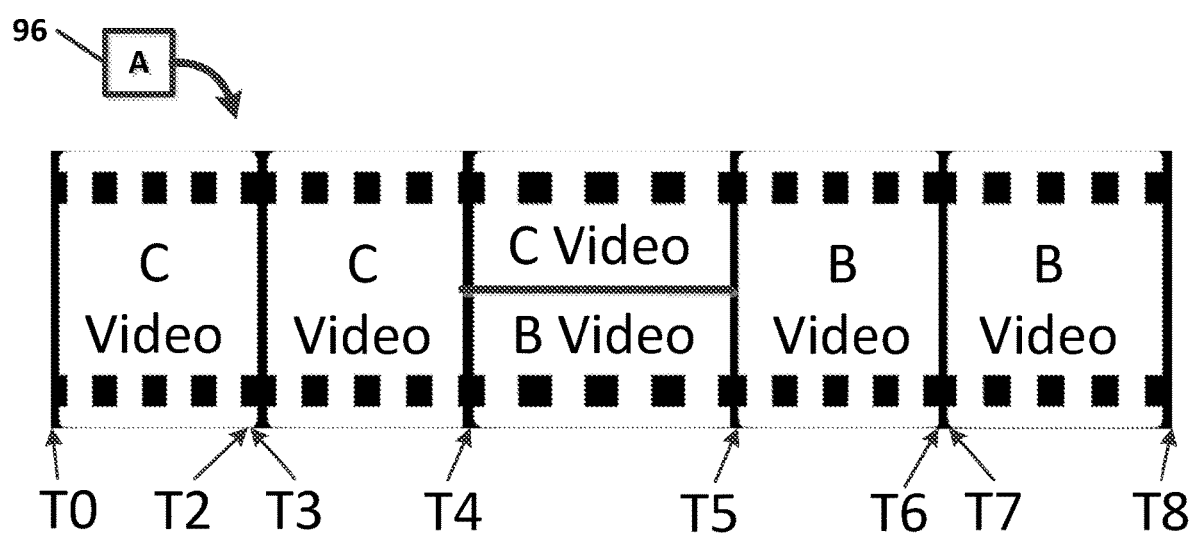
FIG. 11 illustrates the creation of a compiled multimedia data from the multimedia data and additional data of FIG. 10 in response to input according to embodiments of the present inventive concepts.

FIG. 11 illustrates the creation of a compiled multimedia data 90 from the multimedia data 92 and additional data 94 of FIG. 10 in response to input 96 according to embodiments of the present inventive concepts.

Referring to FIG. 11, an example is illustrated of the creation of a compiled multimedia data 90 responsive to input 96 indicating that the compiled multimedia data 90 should be created based on wireless sensor 20A. In some embodiments, the input 96 may directly identify wireless sensor 20A based on its unique identification code 27 (see FIG. 1). In some embodiments, the input 96 may identify a user or other identification element that can be mapped to the wireless sensor 20A. The example assumes that prior to the creation of the compiled multimedia data 90, the server 220 was provided with recorded multimedia data 92 and additional data 94 as illustrated in FIG. 10. It will be understood that additional configuration and combinations of data and inputs are possible without deviating from the present inventive concepts.

In response to the input 96 indicating the wireless sensor 20A, the server 220 may analyze the provided multimedia data 92 and additional data 94 as illustrated in FIG. 10. As indicated in FIG. 10, the wireless sensor 20A is associated with four multimedia segments. Namely, wireless sensor 20A is associated with User B's multimedia data from T4 to T6, and from T7 to T8, as well as User C's multimedia data from T1 to T2 and T3 to T5, where the timestamps increase numerically as time progresses. Further analysis may show that the multimedia data 92 of User B and C overlap in time from T4 to T5.

In response to this configuration, the server 220 may create compiled multimedia data 90 as illustrated in FIG. 11. More specifically, in response to user input 96 identifying wireless sensor 20A, the server 220 may create compiled multimedia data 90 including 5 segments. The first segment may include User C's video from timestamp T1 to T2. After timestamp T2, the compiled multimedia data 90 may skip from T2 to T3. This skip may allow the compiled multimedia data 90 to jump directly to portions of the compiled multimedia data 90 that primarily correspond to wireless sensor 20A. The compiled multimedia data 90 may continue from T3 with User C's video from timestamp T3 to T4.

At timestamp T4, the provided recorded multimedia data 92 indicates that both User C and User B provided multimedia data 92 that corresponded to wireless sensor 20A that overlaps in time. Accordingly, the compiled multimedia data 90 may include a split view showing multimedia data 92 from both User C and User B. As a result, the compiled multimedia data 90 may show the same time period from different views. Though illustrated as a split view in FIG. 11, it will be understood that other configurations of the time-overlapped multimedia segments are possible. For example, in some embodiments, the time-overlapped multimedia segments may be played one after the other. In some embodiments, the additional data 94 may be analyzed to select one of the time-overlapped multimedia segments to display instead of the other. For example, in some embodiments, the additional data 94 may indicate a determined distance (as discussed herein with respect to FIG. 2) between the recording image capturing device 10 and the wireless sensor 20. The distance may be taken into account when selecting which of the time-overlapped multimedia segments to display such that the multimedia data that was recorded at a closer distance to the wireless sensor 20 may be preferentially shown in the compiled multimedia data 90. It will be understood that other criteria may be used to combine time-overlapped multimedia segments without deviating from the present inventive concepts.

After T5, the compiled multimedia data 90 may switch from the combined view to showing only video from User B until timestamp T6. After timestamp T6, the compiled multimedia data 90 may skip from timestamp T6 to T7. The compiled multimedia data 90 may continue from timestamp T7 to T8 using only User B's video. The compiled multimedia data 90 may end at timestamp T8.

In should be noted that, since the recorded multimedia data 92 provided to the server 220 may include recorded segments for wireless sensors that were not registered (e.g. wireless sensors that were recorded additionally while a primary registered wireless sensor was being recorded), it may be possible for a larger number of recorded multimedia segments to be made available for the creation of compiled multimedia data 90. For example, referring to the multimedia segments of FIG. 10, it can be seen that there are multiple segments including wireless sensor 20D associated with User D. Thus, though User D was not part of the group of Users A, B, and C that were pursuing their activities together in FIGS. 8A and 8B, the image capturing devices of User A, B, and C nonetheless captured video segments which included a wireless sensor 20D associated with User D. As a result, in some embodiments, a user could request the creation of a compiled multimedia data 90 for the wireless sensor 20D associated with User D and include recorded multimedia data segments from Users A, B, and C that may have been unknown to User D at the time they were recorded. It will be understood that the server 220 could employ various types of permission mechanisms to control access and/or privacy between various users of such a video compilation system.

As noted herein, the recorded multimedia data 92 may include both photo and video segments. FIG. 12 illustrates an example embodiment in which photo and video segments may be combined in a compiled multimedia data 90. As illustrated in FIG. 12, a frame of the compiled multimedia data 90 may be segmented such that different portions of the compiled multimedia data 90 illustrate still photos while other segments illustrate video. Though one configuration of such data is illustrated in FIG. 12, it will be understood that other configurations are possible. For example, in some embodiments, still photos may be inserted within video segments of the compiled multimedia data 90 using a fade-in or other video transition technique to intersperse the still photos within the video segments.

Figure 13:
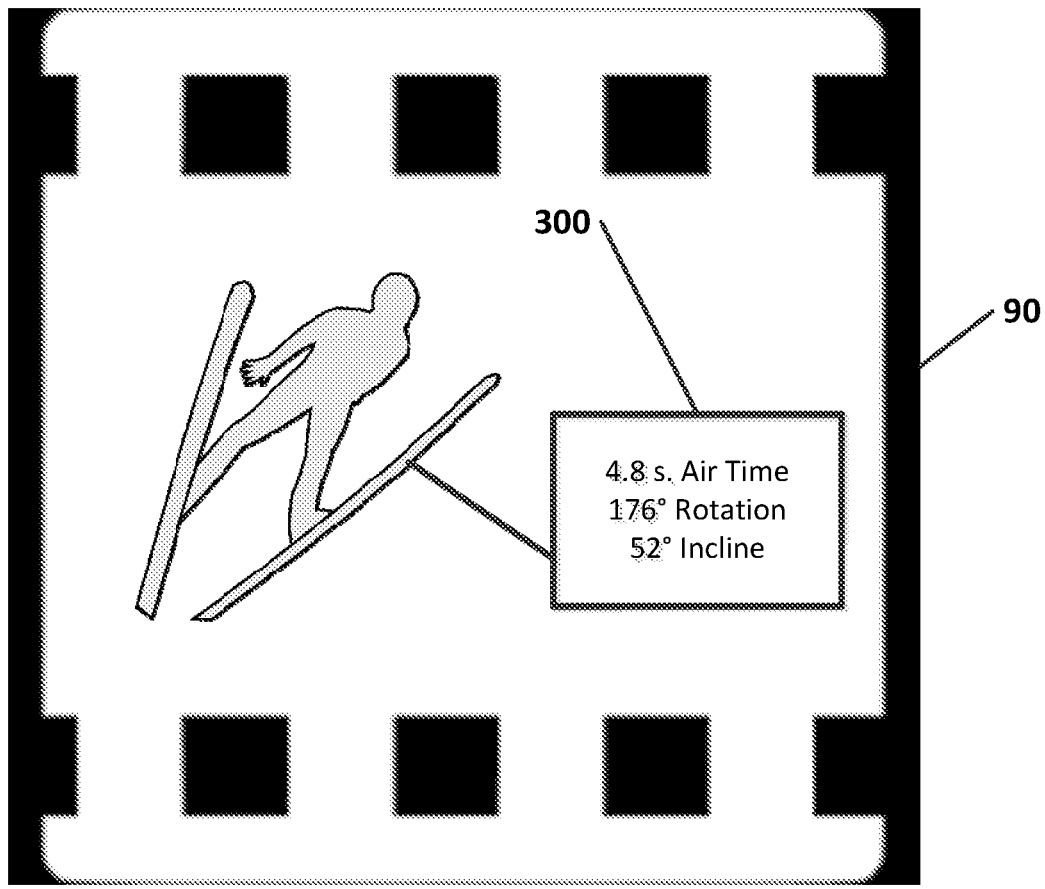
FIG. 13 illustrates an example embodiment of the present inventive concepts in which the measurement data can be included within the compiled multimedia data.

As noted herein, the additional data 94 (see FIG. 9) associated with the wireless sensors can include other measurement data, such as weather, speed, GPS location, etc. that is provided by the wireless sensor as part of its data transmission to the image capturing device. FIG. 13 illustrates an example embodiment in which the measurement data can be included within the compiled multimedia data 90. As illustrated in FIG. 13, the compiled multimedia data 90 may be augmented with a measurement data overlay 300. The measurement data included in the measurement data overlay 300 may include data provided by the wireless sensor 20 to the image capturing device (see FIG. 2). Generation of the compiled multimedia data 90 may include automated identification of the elements of the underlying recorded multimedia data 92 using video analysis algorithms to identify elements displayed in the multimedia data to which the measurement data overlay 300 can be visually attached.

As described herein, image capturing devices, methods of operating image capturing devices, and related computer program products may improve an efficiency of storing multimedia data by limiting the recording of the multimedia data to those moments when a relevant element of interest to the user is visible to the image capturing device. The storage required to store such multimedia data may be decreased due to the reduced amount of recording, and the battery life of associated devices may be appreciably increased due to a reduced operation time. In addition, transfer times of recorded multimedia data may be reduced as the underlying multimedia data contains only those time periods of interest to the user.

Also as described herein, multimedia compilation servers, methods of operating multimedia compilation servers, and related computer program products may reduce a storage required by the associated server due to the transfer of smaller recorded multimedia data. In addition, the processing time of such compilations may be reduced due to the ability to directly determine which recorded multimedia data is of interest while compiling multimedia data that is specifically tuned to be relevant to a requesting user.

Figure 14:
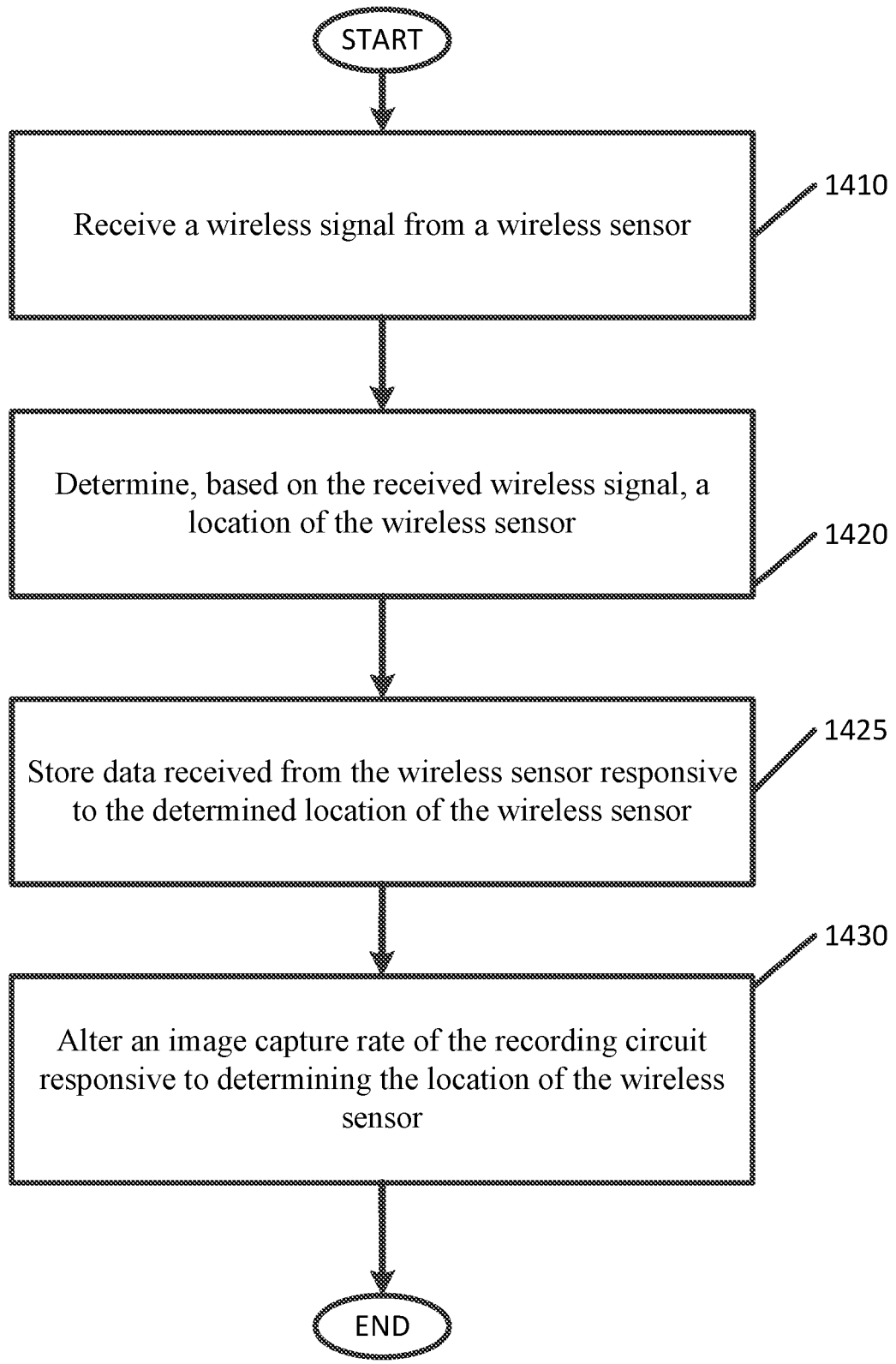
FIG. 14 is a flowchart of operations for operating an image capturing device according to some embodiments of the present inventive concepts.

FIG. 14 is a flowchart of operations for operating an image capturing device 10 according to some embodiments of the present inventive concepts. These operations may be performed, for example, by the image capturing device 10 of FIG. 2.

Referring to FIG. 14, the operations may begin with block 1410 in which the image capturing device 10 receives a wireless signal from a wireless sensor 20. For example, as illustrated in FIGS. 1 and 2, the image capturing device 10 may receiving the wireless signal over a communication path 15 from a wireless sensor 20 in the proximity of the image capturing device 10.

The operations may continue with block 1420 in which the image capturing device 10 may determine, based on the received wireless signal, a location of the wireless sensor 20. For example, in some embodiments, as discussed herein with respect to FIG. 2, a signal reception circuit 25 of the image capturing device 10 may determine an angle of arrival of the received wireless signal and/or a signal strength of the received wireless signal to determine the location of the wireless sensor 20. In some embodiments, a GPS location may be extracted from the received wireless signal to determine a location of wireless sensor 20.

The operations may continue with block 1425 in which the image capturing device 10 may store data received from the wireless sensor 20 responsive to the determined location of the wireless sensor 20. For example, as discussed with respect to FIG. 2, the image capturing device 10 may store additional data within a storage circuit 29 related to the wireless sensor 20. In some embodiments, the additional data can include corresponding to when first wireless sensor 20 becomes visible within the lens 12 of the image capturing device 10 and when the first sensor 20 leaves the view of the lens 12 of the image capturing device 10. In some embodiments, the additional data received from the wireless sensor 20 such as, but not limited to, speed data, positioning data, meteorological data, etc.

The operations may continue with block 1430 in which the image capturing device 10 may alter an image capture rate of a recording circuit of the image capturing device 10 responsive to determining the location of the wireless sensor 20. For example, as discussed with respect to FIGS. 3A, 3B, 4A, and 4B, the image capturing device 10 may transition between a recording rate 40a and a non-recording rate 40b responsive to the determined position of the wireless sensor 20. As discussed with respect to FIGS. 5A and 5B, the image capturing device 10 may initiate movement of the image capturing device 10 responsive to the determined position of the wireless sensor 20. As discussed with respect to FIGS. 5A and 5B, the image capturing device 10 may alter a field of view of the image capturing device 10 responsive to the determined position of the wireless sensor 20. As discussed with respect to FIG. 7A, the image capturing device 10 may transition to a video rate 60a responsive to the determined position of the wireless sensor 20. As discussed with respect to FIG. 7B, the image capturing device 10 may transition to a slow-motion video rate 60b responsive to the determined position of the wireless sensor 20. As discussed with respect to FIG. 7C, the image capturing device 10 may transition to a still photo rate 60c responsive to the determined position of the wireless sensor 20. As discussed with respect to FIG. 7D, the image capturing device 10 may transition to a burst photo rate 60d responsive to the determined position of the wireless sensor 20. Though specific alterations of the frame capture rate have been discussed with respect to FIGS. 3A-7D, it will be understood that the present inventive concepts are not limited thereto, and other alterations are possible without deviating from the present inventive concepts. In some embodiments, operation 1430 may be optional.

Though FIG. 14 illustrates a single iteration of a procedure of the image capturing device 10, it will be understood that the operations may repeat for one or more wireless sensors 20. Thus, the operations may repeat continuously such that one or more wireless sensors 20 may be tracked by the image capturing device 10.

Figure 15:
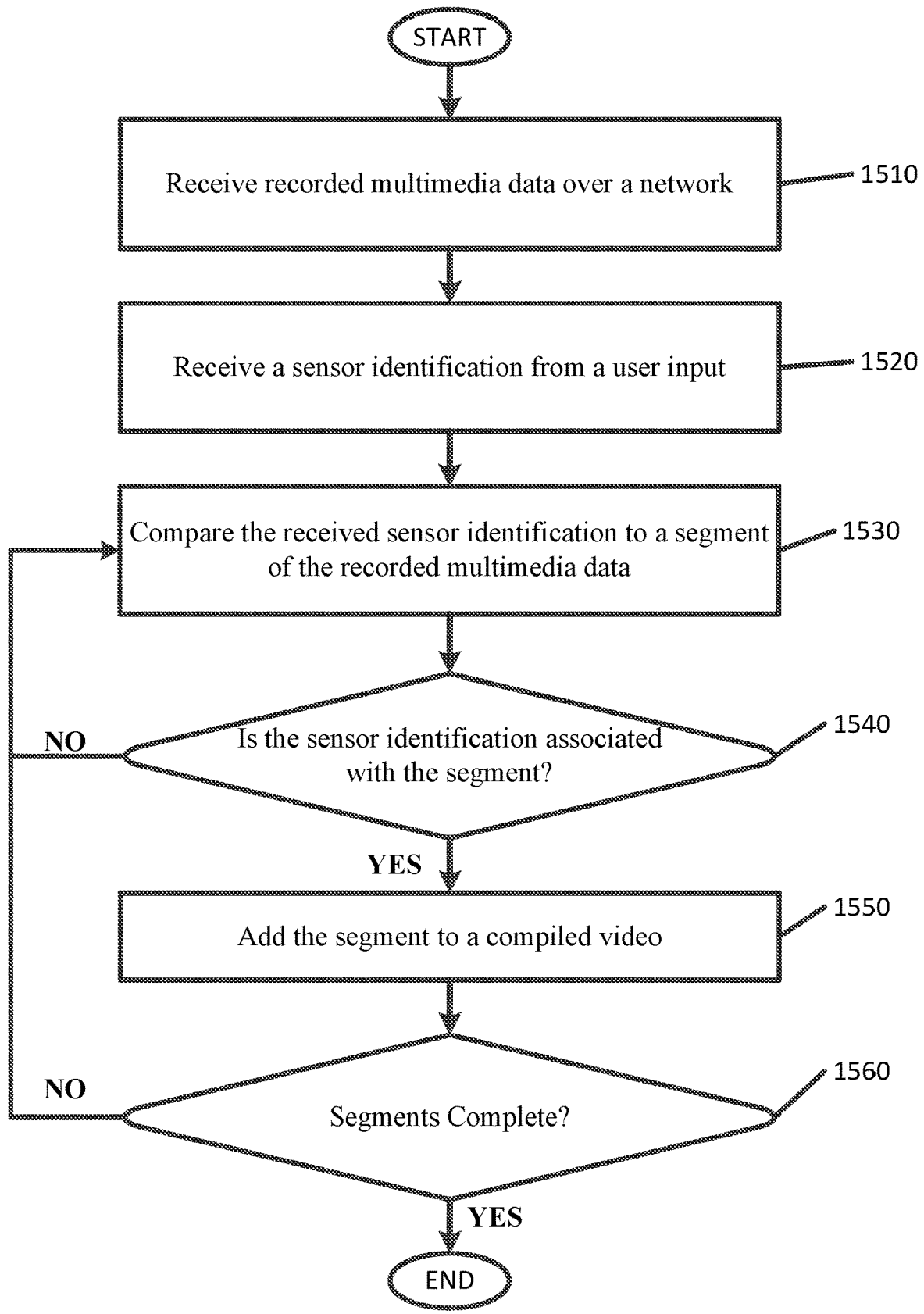
FIG. 15 is a flowchart of operations for operating multimedia compilation server according to some embodiments of the present inventive concepts.

FIG. 15 is a flowchart of operations for operating multimedia compilation server 220 according to some embodiments of the present inventive concepts. These operations may be performed, for example, by the compilation server 220 of FIG. 9.

Referring to FIG. 15, the operations may begin with block 1510 in which the multimedia compilation server 220 receives recorded multimedia data 92 over the network 100. For example, as illustrated and discussed herein with respect to FIG. 9, the multimedia compilation server 220 may receive one or more segments of recorded multimedia data 92 from one or more image capturing devices 10. The recorded multimedia data 92 may represent data recorded by the one or more image capturing devices 10.

The operations may continue with block 1520 in which the multimedia compilation server 220 receives a sensor identification from a user input, such as the user input 96 illustrated in FIG. 9. The user input 96 may identify a particular wireless sensor 20 and/or be capable of being mapped to a particular wireless sensor 20. The received sensor identification input 96 may identify a particular wireless sensor 20 as a relevant wireless sensor 20 about which the multimedia compilation server 220 will create compiled multimedia data 90.

The operations may continue with block 1520 in which the multimedia compilation server 220 compares the received sensor identification input 96 to a segment of the recorded multimedia data 92 that was received at block 1510. At block 1540, the multimedia compilation server 220 may determine if the received sensor identification input 96 is associated with the particular segment of the recorded multimedia data 92. As described herein with respect to FIGS. 10-11, this comparison may involve analyzing additional data 94 provided with the received recorded multimedia data 92. The additional data 94 may identify particular time periods of the segment of recorded multimedia data 92 that are associated with one or more wireless sensors 20. In some embodiments, this identification may include timestamps within the additional data 94 that identify the time periods for respective wireless sensors 20.

If the received sensor identification input 96 is associated with the segment of the recorded multimedia data 92, then the segment may be added to the compiled multimedia data 90 in block 1550. If the received sensor identification input 96 is not associated with the segment of the recorded multimedia data 92, then the operations may return to block 1530 to begin processing the next segment of the recorded multimedia data 92.

In block 1560, the multimedia compilation server 220 may determine if any segments of the recorded multimedia data 92 remain. If so, the operations may return to block 1530 to begin processing the next segment of the recorded multimedia data 92. If not, the operations may complete.

Though FIG. 15 illustrates a single iteration of a procedure of the multimedia compilation server 220, it will be understood that the operations may repeat for one or more iterations. Thus, the operations may process additional segments of recording multimedia data 92 and create multiple compiled multimedia data 90 in response to one or more sensor identifications received as input 96.

Figure 16:
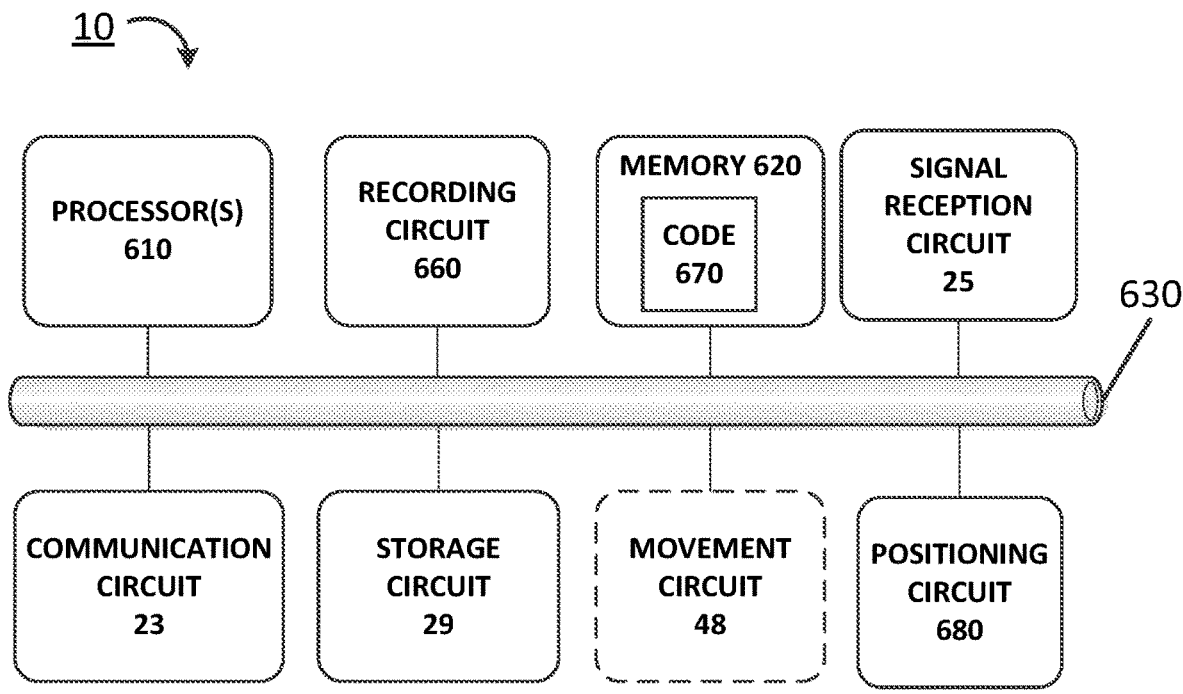
FIG. 16 is a block diagram of an image capturing device according to some embodiments of the present inventive concepts.

FIG. 16 is a block diagram of an image capturing device 10 according to some embodiments of the present inventive concepts. The image capturing device 10 may use hardware, software implemented with hardware, firmware, tangible computer-readable storage media having instructions stored thereon and/or a combination thereof, and may be implemented in one or more computer systems or other processing systems. As such, the devices and methods described herein may be embodied in any combination of hardware and software.

As shown in FIG. 16, the image capturing device 10 may include one or more processors 610 and memory 620 coupled to an interconnect 630. The interconnect 630 may be an abstraction that represents any one or more separate physical buses, point to point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The processor(s) 610 may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks. The processor 610 may be configured to execute computer program instructions from the memory 620 to perform some or all of the operations and methods for one or more of the embodiments disclosed herein.

The image capturing device 10 may also include a communication circuit 23 including one or more communication adapters that may communicate with other communication devices and/or one or more networks, including any conventional, public and/or private, real and/or virtual, wired and/or wireless network, including the Internet. The communication circuit 23 may include a communication interface and may be used to transfer information in the form of signals between the image capturing device 10 and another computer system or a network (e.g., the Internet). The communication circuit 23 may include a modem, a network interface (such as an Ethernet card), a wireless interface, a radio interface, a communications port, a PCMCIA slot and card, or the like. These components may be conventional components, such as those used in many conventional computing devices, and their functionality, with respect to conventional operations, is generally known to those skilled in the art.

The image capturing device 10 may further include memory 620 which may contain program code 670 configured to execute operations associated with the methods described herein. The memory 620 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk).

The image capturing device 10 may also include a storage circuit 29. The storage circuit 29 may be configured to store multimedia data 92 recorded by the image capturing device 10 and/or additional data 94 associated with wireless sensors 20 as described herein. The storage circuit 29 may include volatile and/or non-volatile storage mechanisms accessible by one or more processors 610 and/or the communication circuit 23.

The image capturing device 10 may also include a recording circuit 660. The recording circuit 660 may implement technology configured to process multimedia received at the image capturing device 10. The recording circuit 660 may be further configured to store recorded multimedia data 92 in the storage circuit 29. For example the recording circuit 660 may include an image sensor coupled to a lens 12 (see FIG. 1) of the image capturing device 10.

The image capturing device 10 may also include a signal reception circuit 25 capable of receiving a wireless signal transmitted by a wireless sensor 20 (see FIG. 1). The signal reception circuit 25 may be further configured to determine characteristics of the received wireless signal such as an angle of arrival and/or signal strength. The signal reception circuit 25 may also be configured to extract received wireless sensor data from the received wireless signal for storage in the storage circuit 29.

The image capturing device 10 may also include a positioning circuit 680 capable of determining a position of a wireless sensor 20 (see FIG. 1) based on a wireless signal received by the signal reception circuit 25. In some embodiments, the positioning circuit 680 may be a part of the signal reception circuit 25. The positioning circuit 680 may be configured to determine the position based on, for example, an angle of arrival of the wireless signal and/or a signal strength of the received wireless signal. In some embodiments, the positioning circuit 680 may determine the position of the wireless sensor 20 based on the extraction of GPS data from the wireless signal transmission.

The image capturing device 10 may optionally include a movement circuit 48. The movement circuit 48 may be configured to move the image capturing device 10 responsive to electronic control signals. In some embodiments, the movement circuit 48 may move the image capturing device 10 responsive to a determined position of a wireless sensor 20 as discussed herein with respect to FIGS. 5A and 5B.

Figure 17:
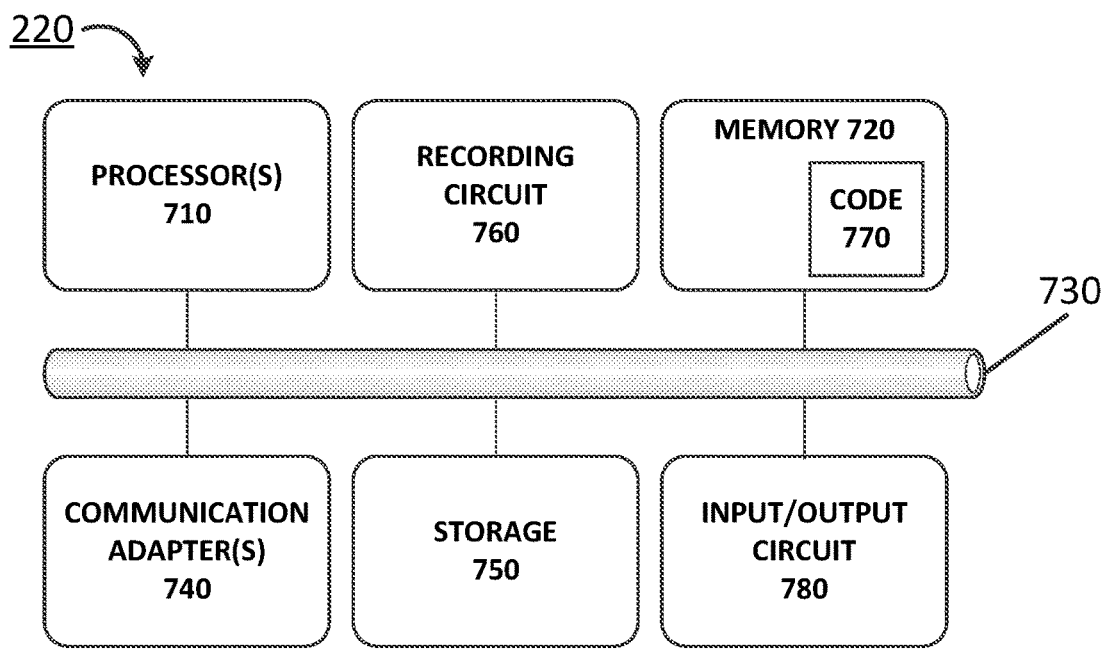
FIG. 17 is a block diagram of multimedia compilation server according to some embodiments of the present inventive concepts.

FIG. 17 is a block diagram of multimedia compilation server 220 according to some embodiments of the present inventive concepts. The multimedia compilation server 220 may use hardware, software implemented with hardware, firmware, tangible computer-readable storage media having instructions stored thereon and/or a combination thereof, and may be implemented in one or more computer systems or other processing systems. The multimedia compilation server 220 may also utilize a virtual instance of a computer and/or other virtual processing mechanisms. As such, the devices and methods described herein may be embodied in any combination of hardware and software.

As shown in FIG. 17, the multimedia compilation server 220 may include one or more processors 710 and memory 720 coupled to an interconnect 730. The interconnect 730 may be an abstraction that represents any one or more separate physical buses, point to point connections, or both connected by appropriate bridges, adapters, or controllers. The interconnect 730, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 710 may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks. The processor 710 may be configured to execute computer program instructions from the memory 720 to perform some or all of the operations and methods for one or more of the embodiments disclosed herein.

The multimedia compilation server 220 may also include one or more communication adapters 740 that may communicate with other communication devices and/or one or more networks, including any conventional, public and/or private, real and/or virtual, wired and/or wireless network, including the Internet. The communication adapter(s) 740 may include a communication interface and may be used to transfer information in the form of signals between the multimedia compilation server 220 and another computer system or a network (e.g., the Internet). The communication adapters 740 may include a modem, a network interface (such as an Ethernet card), a wireless interface, a radio interface, a communications port, a PCMCIA slot and card, or the like. These components may be conventional components, such as those used in many conventional computing devices, and their functionality, with respect to conventional operations, is generally known to those skilled in the art.

The multimedia compilation server 220 may further include memory 720 which may contain program code 770 configured to execute operations associated with the methods described herein. The memory 720 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk).

The multimedia compilation server 220 may also include a recording circuit 760. The recording circuit 760 may be configured to generate compiled multimedia data 90 from segments of recorded multimedia data 92 received from a plurality of image capturing devices 10 as described herein with respect to FIGS. 9-13. The recording circuit 760 may be able to access storage 750 to access the segments of recorded multimedia data 92 as well as additional sensor data 94 used in the compilation of the compiled multimedia data 90.

The multimedia compilation server 220 may also include storage 750. The storage 750 may be configured to store multimedia data and/or additional data associated with wireless sensors 20 received over the communication adapter(s) 740 as described herein. The storage 750 may also be configured to store compiled multimedia data 90 generated by the recording circuit 760. The storage 750 may include volatile and/or non-volatile storage mechanisms accessible by one or more processors 710 and/or the communication adapter(s) 740.

The multimedia compilation server 220 may also include an input/output circuit 780. The input/output circuit 780 may be configured to receive input from devices such as, but not limited to, a keyboard and/or mouse. The input/output circuit 780 may be accessible to the one or more processors 710 via the system interconnect 730 and may be operated by the program code 770 resident in the memory 720. In some embodiments, the input/output circuit 780 may provide the sensor identification input 96 (see FIG. 11) used to generate the compiled multimedia data 90.

As will be appreciated by one skilled in the art, aspects of the present inventive concepts may be illustrated and described herein in any of a number of patentable classes or context including any new and useful process, machine, manufacture, or composition of matter, or any new and useful improvement thereof. Accordingly, aspects of the present inventive concepts may be implemented entirely hardware, entirely software (including firmware, resident software, micro-code, etc.) or combining software and hardware implementation that may all generally be referred to herein as a "circuit," "module," "component," or "system." Furthermore, aspects of the present inventive concepts may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present inventive concepts may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present inventive concepts are described herein with reference to flowchart illustrations and/or block diagrams of methods, apparatus (systems) and computer program products according to embodiments of the present inventive concepts. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present inventive concepts. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present inventive concepts has been presented for purposes of illustration and description, but is not intended to be exhaustive or limited to the present inventive concepts in the form disclosed. Many modifications and variations will be apparent to those of ordinary skill in the art without departing from the scope and spirit of the present inventive concepts. The aspects of the present inventive concepts herein were chosen and described in order to best explain the principles of the present inventive concepts and the practical application, and to enable others of ordinary skill in the art to understand the present inventive concepts with various modifications as are suited to the particular use contemplated.

What is claimed is:

1. An image capturing device, comprising:
   a recording circuit configured to record multimedia data of a field of view of the image capturing device;
   a receiving circuit configured to receive a wireless signal from a wireless sensor;
   a location determining circuit configured to determine, based on the received wireless signal, a location of the wireless sensor, an angle of arrival of the received wireless signal, a signal strength of the received wireless signal, and a distance from the wireless sensor to the image capturing device;
   a storage circuit configured to store data associated with the wireless sensor responsive to a comparison of the determined location of the wireless sensor and the field of view of the image capturing device so as to create an association between the data associated with the wireless sensor and the recorded multimedia data; and
   a mode circuit configured to alter an image capture rate of the recording circuit based on the determined location of the wireless sensor, the angle of arrival of the received wireless signal, the signal strength of the received wireless signal, and the distance from the wireless sensor to the image capturing device,
   wherein the mode circuit is configured to alter the image capture rate of the recording circuit from a video rate to a still-photo rate, based on the determined location of the wireless sensor, the angle of arrival of the received wireless signal, the signal strength of the received wireless signal, and the distance from the wireless sensor to the image capturing device.

2. The image capturing device of claim 1, further comprising a speed determining circuit configured to determine, based on the received wireless signal, a speed of the wireless sensor, wherein the mode circuit is configured to alter the image capture rate of the recording circuit based on a determined speed of the wireless sensor, and
   wherein the mode circuit is configured to alter the image capture rate of the recording circuit by:
   changing a frame rate of video recorded by the image capturing device based on the determined speed of the wireless sensor, or
   changing from a single photo rate to a burst photo rate based on the determined speed of the wireless sensor.

3. The image capturing device of claim 1, further comprising a movement circuit configured to alter a position and/or orientation of the image capturing device based on the determined location of the wireless sensor,
   wherein the wireless sensor comprises a plurality of wireless sensors,
   wherein the storage circuit is further configured to store a respective priority for each of the plurality of wireless sensors, and
   wherein the movement circuit is configured to alter the field of view of the image capturing device based on the determined location of at least one of the plurality of wireless sensors and based on the respective priority of the at least one of the plurality of wireless sensors.

4. The image capturing device of claim 3, wherein the image capturing device is a first image capturing device that further comprises a communication circuit, and
   wherein the communication circuit is configured to wirelessly communicate configuration information associated with the plurality of wireless sensors to a second image capturing device.

5. The image capturing device of claim 1, wherein the storage circuit is further configured to store a time based on the data received from the wireless sensor and the determined location of the wireless sensor, and
   wherein the time that is stored is based on a determination that the wireless sensor is positioned so as to be recorded by the image capturing device.

6. The image capturing device of claim 5, wherein the image capturing device is configured to determine that the wireless sensor is positioned so as to be recorded by the image capturing device based on a determination that the wireless sensor is in view of a lens of the image capturing device.

7. A method of operating an image capturing device comprising:
   recording multimedia data of a field of view of the image capturing device;
   receiving a wireless signal from a wireless sensor;
   determining, based on the received wireless signal, a location of the wireless sensor, an angle of arrival of the received wireless signal, a signal strength of the received wireless signal, and a distance from the wireless sensor to the image capturing device;
   storing data associated with the wireless sensor responsive to a comparison of the determined location of the wireless sensor and the field of view of the image capturing device so as to create an association between the data associated with the wireless sensor and the recorded multimedia data; and
   altering an image capture rate of the image capturing device based on the determined location of the wireless sensor, the angle of arrival of the received wireless signal, the signal strength of the received wireless signal, and the distance from the wireless sensor to the image capturing device,
   wherein the image capture rate of the image capturing device is altered from a video rate to a still-photo rate, based on the determined location of the wireless sensor, the angle of arrival of the received wireless signal, the signal strength of the received wireless signal, and the distance from the wireless sensor to the image capturing device.

8. The method of claim 7, further comprising:
   determining, based on the received wireless signal, a speed of the wireless sensor; and
   altering an image capture rate of the image capturing device based on a determined speed of the wireless sensor.

9. The method of claim 8, wherein altering the image capture rate comprises:
   changing a frame rate of video recorded by the image capturing device based on the determined speed of the wireless sensor; or
   changing from a single photo rate to a burst photo rate based on the determined speed of the wireless sensor.

10. The method of claim 7, further comprising altering an orientation and/or position of the image capturing device based on the determined location of the wireless sensor.

11. The method of claim 7, further comprising storing a time based on the data received from the wireless sensor and the determined location of the wireless sensor,
   wherein the time that is stored is based on determining that the wireless sensor is positioned so as to be recorded by the image capturing device, and
   wherein determining that the wireless sensor is positioned so as to be recorded by the image capturing device comprises determining that the wireless sensor is in view of a lens of the image capturing device.

* * * * *